(12) United States Patent
Kojima

(10) Patent No.: US 7,508,595 B2
(45) Date of Patent: Mar. 24, 2009

(54) TAKING LENS APPARATUS

(75) Inventor: Kaori Kojima, Kobe (JP)

(73) Assignee: Minolta Co., Ltd., Osaka (JP)

( * ) Notice: Subject to any disclaimer, the term of this patent is extended or adjusted under 35 U.S.C. 154(b) by 1343 days.

(21) Appl. No.: 10/639,313

(22) Filed: Aug. 12, 2003

(65) Prior Publication Data

US 2004/0233302 A1 Nov. 25, 2004

(30) Foreign Application Priority Data

May 20, 2003 (JP) ............................. 2003-142381

(51) Int. Cl.
G02B 15/14 (2006.01)
(52) U.S. Cl. ..................................... 359/687; 359/676
(58) Field of Classification Search ................. 359/687, 359/676, 678
See application file for complete search history.

(56) References Cited

U.S. PATENT DOCUMENTS

| 5,448,319 A | 9/1995 | Iuzawa | 354/81 |
| 6,104,432 A | 8/2000 | Nakamura et al. | 348/360 |
| 6,754,446 B2 * | 6/2004 | Hagimori et al. | 396/72 |
| 6,853,807 B2 * | 2/2005 | Hagimori et al. | 396/72 |
| 6,975,462 B2 * | 12/2005 | Mihara | 359/687 |

FOREIGN PATENT DOCUMENTS

| EP | 0 906 587 B1 | 9/2002 |
| JP | 08-248318 A | 9/1996 |
| JP | 11-196303 A | 7/1999 |
| JP | 11-258678 A | 9/1999 |
| JP | 2000-131610 A | 5/2000 |

* cited by examiner

Primary Examiner—Jordan M. Schwartz
(74) Attorney, Agent, or Firm—Sidley Austin LLP

(57) ABSTRACT

A taking lens apparatus has a zoom lens system that forms an optical image of an object at a variable magnification and that includes an aperture stop in the optical path, and an image sensor that has a light-receiving surface that converts the optical image into an electrical image signal and outputs it. The zoom lens system includes an optical member having a reflective surface that reflects a light beam in such a way that the optical axis is bent at substantially 90°. Moreover, prescribed conditions are fulfilled among the focal length of the entire zoom lens system at the wide-angle end, at the telephoto end, the axial distance from the image plane to the exit pupil at the wide-angle end, and the axial distance from the image-side surface of the most image-side lens element to the image plane.

22 Claims, 17 Drawing Sheets

FIG.9A
FNO=3.10
FIG.9B
Y'=2.5
FIG.9C
Y'=2.5
(W)
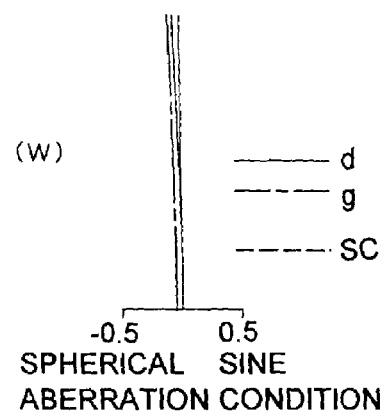
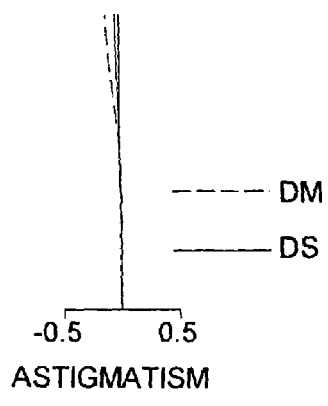
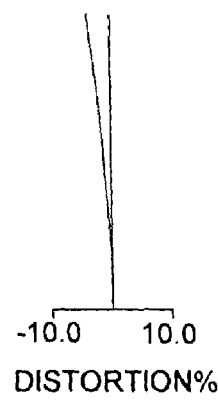
—— d
– – – g
– - – SC
– – – DM
—— DS
-0.5   0.5
SPHERICAL   SINE
ABERRATION CONDITION
-0.5   0.5
ASTIGMATISM
-10.0   10.0
DISTORTION%
FIG.9D
FNO=3.50
FIG.9E
Y'=2.5
FIG.9F
Y'=2.5
(M)
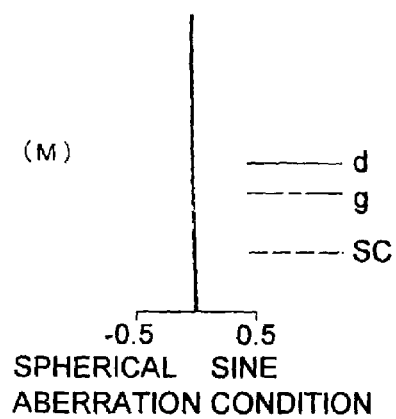
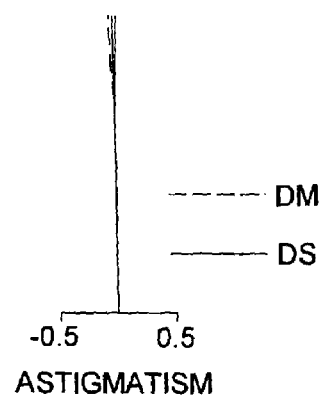
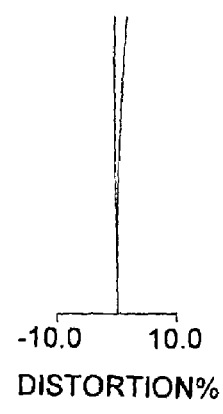
—— d
– – – g
– - – SC
– – – DM
—— DS
-0.5   0.5
SPHERICAL   SINE
ABERRATION CONDITION
-0.5   0.5
ASTIGMATISM
-10.0   10.0
DISTORTION%
FIG.9G
FNO=4.00
FIG.9H
Y'=2.5
FIG.9I
Y'=2.5
(T)
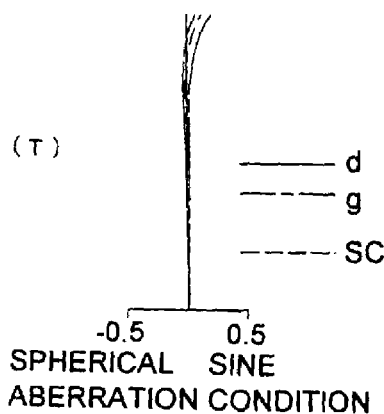
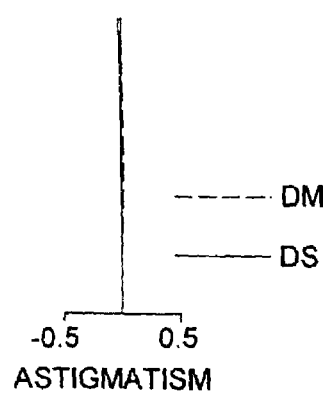
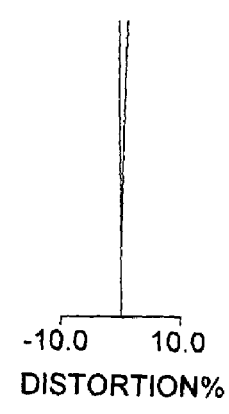
—— d
– – – g
– - – SC
– – – DM
—— DS
-0.5   0.5
SPHERICAL   SINE
ABERRATION CONDITION
-0.5   0.5
ASTIGMATISM
-10.0   10.0
DISTORTION%

FNO=3.10

(W)
— d
— — g
— — — SC

-0.5  0.5
SPHERICAL SINE
ABERRATION CONDITION

Y'=2.5

— — — DM
——— DS

-0.5  0.5
ASTIGMATISM

Y'=2.5

-10.0  10.0
DISTORTION%

FNO=3.50

(M)
— d
— — g
— — — SC

-0.5  0.5
SPHERICAL SINE
ABERRATION CONDITION

Y'=2.5

— — — DM
——— DS

-0.5  0.5
ASTIGMATISM

Y'=2.5

-10.0  10.0
DISTORTION%

FNO=4.00

(T)
— d
— — g
— — — SC

-0.5  0.5
SPHERICAL SINE
ABERRATION CONDITION

Y'=2.5

— — — DM
——— DS

-0.5  0.5
ASTIGMATISM

Y'=2.5

-10.0  10.0
DISTORTION%

FNO=3.10

(W)
— d
--- g
--- SC

-0.5　0.5
SPHERICAL SINE
ABERRATION CONDITION

Y'=2.5

--- DM
— DS

-0.5　0.5
ASTIGMATISM

Y'=2.5

-10.0　10.0
DISTORTION%

FNO=3.50

(M)
— d
--- g
--- SC

-0.5　0.5
SPHERICAL SINE
ABERRATION CONDITION

Y'=2.5

--- DM
— DS

-0.5　0.5
ASTIGMATISM

Y'=2.5

-10.0　10.0
DISTORTION%

FNO=4.00

(T)
— d
--- g
--- SC

-0.5　0.5
SPHERICAL SINE
ABERRATION CONDITION

Y'=2.5

--- DM
— DS

-0.5　0.5
ASTIGMATISM

Y'=2.5

-10.0　10.0
DISTORTION%

FNO=3.10

(W)
— d
--- g
----- SC

-0.5  0.5
SPHERICAL SINE
ABERRATION CONDITION

Y'=2.5

----- DM
— DS

-0.5  0.5
ASTIGMATISM

Y'=2.5

-10.0  10.0
DISTORTION%

FNO=3.50

(M)
— d
--- g
----- SC

-0.5  0.5
SPHERICAL SINE
ABERRATION CONDITION

Y'=2.5

----- DM
— DS

-0.5  0.5
ASTIGMATISM

Y'=2.5

-10.0  10.0
DISTORTION%

FNO=4.00

(T)
— d
--- g
----- SC

-0.5  0.5
SPHERICAL SINE
ABERRATION CONDITION

Y'=2.5

----- DM
— DS

-0.5  0.5
ASTIGMATISM

Y'=2.5

-10.0  10.0
DISTORTION%

FNO=3.10

(W)
— d
--- g
-·- SC

-0.5  0.5
SPHERICAL SINE
ABERRATION CONDITION

Y'=2.5

--- DM
— DS

-0.5  0.5
ASTIGMATISM

Y'=2.5

-10.0  10.0
DISTORTION%

FNO=3.50

(M)
— d
--- g
-·- SC

-0.5  0.5
SPHERICAL SINE
ABERRATION CONDITION

Y'=2.5

--- DM
— DS

-0.5  0.5
ASTIGMATISM

Y'=2.5

-10.0  10.0
DISTORTION%

FNO=4.00

(T)
— d
--- g
-·- SC

-0.5  0.5
SPHERICAL SINE
ABERRATION CONDITION

Y'=2.5

--- DM
— DS

-0.5  0.5
ASTIGMATISM

Y'=2.5

-10.0  10.0
DISTORTION%

FNO=3.10

(W)
— d
--- g
----- SC

-0.5    0.5
SPHERICAL  SINE
ABERRATION CONDITION

Y'=2.5

----- DM
——— DS

-0.5    0.5
ASTIGMATISM

Y'=2.5

-10.0    10.0
DISTORTION%

FNO=3.50

(M)
— d
--- g
----- SC

-0.5    0.5
SPHERICAL  SINE
ABERRATION CONDITION

Y'=2.5

----- DM
——— DS

-0.5    0.5
ASTIGMATISM

Y'=2.5

-10.0    10.0
DISTORTION%

FNO=4.00

(T)
— d
--- g
----- SC

-0.5    0.5
SPHERICAL  SINE
ABERRATION CONDITION

Y'=2.5

----- DM
——— DS

-0.5    0.5
ASTIGMATISM

Y'=2.5

-10.0    10.0
DISTORTION%

FNO=3.10

(W)
— d
--- g
----- SC

-0.5 0.5
SPHERICAL SINE
ABERRATION CONDITION

Y'=2.5

----- DM
— DS

-0.5 0.5
ASTIGMATISM

Y'=2.5

-10.0 10.0
DISTORTION%

FNO=3.50

(M)
— d
--- g
----- SC

-0.5 0.5
SPHERICAL SINE
ABERRATION CONDITION

Y'=2.5

----- DM
— DS

-0.5 0.5
ASTIGMATISM

Y'=2.5

-10.0 10.0
DISTORTION%

FNO=4.00

(T)
— d
--- g
----- SC

-0.5 0.5
SPHERICAL SINE
ABERRATION CONDITION

Y'=2.5

----- DM
— DS

-0.5 0.5
ASTIGMATISM

Y'=2.5

-10.0 10.0
DISTORTION%

FNO=3.10

(W)
— d
— — g
- - - - SC

-0.5    0.5
SPHERICAL  SINE
ABERRATION CONDITION

Y'=2.5

- - - - DM
—— DS

-0.5    0.5
ASTIGMATISM

Y'=2.5

-5.0    5.0
DISTORTION%

FNO=3.50

(M)
— d
— — g
- - - - SC

-0.5    0.5
SPHERICAL  SINE
ABERRATION CONDITION

Y'=2.5

- - - - DM
—— DS

-0.5    0.5
ASTIGMATISM

Y'=2.5

-5.0    5.0
DISTORTION%

FNO=4.00

(T)
— d
— — g
- - - - SC

-0.5    0.5
SPHERICAL  SINE
ABERRATION CONDITION

Y'=2.5

- - - - DM
—— DS

-0.5    0.5
ASTIGMATISM

Y'=2.5

-5.0    5.0
DISTORTION%

TAKING LENS APPARATUS

This application is based on Japanese Patent Application No. 2003-142381 filed on May 20, 2003, the contents of which are hereby incorporated by reference.

BACKGROUND OF THE INVENTION

1. Field of the Invention

The present invention relates to a taking lens apparatus. More specifically, the present invention relates to a taking lens apparatus (a main component of a digital camera, video camera, or camera incorporated in or externally fitted to a personal computer, mobile computer, cellular phone, personal digital assistant (PDA), or the like) that optically takes in an image of a subject through a taking lens system and that then outputs it in the form of an electrical signal by means of an image sensor, and in particular to a taking lens apparatus incorporating a compact zoom lens system as its taking lens system.

2. Description of the Prior Art

In recent years, digital cameras, which use an image sensor such as a CCD (charge-coupled device) instead of silver halide film, have been rapidly becoming increasingly popular. On the other hand, as the image processing power of semiconductor devices and the like increases, cameras using an image sensor have come to be increasingly incorporated in cellular phones, PDAs, and the like. Under these circumstances, further compactness is sought in taking lens apparatuses used to take an image of a subject and outputs it in the form of an electrical signal by means of an image sensor. In addition, sought nowadays are not simple taking lens apparatuses like those conventionally common, but taking lens apparatuses that offer high resolution combined with correspondingly high optical performance and optical zooming with minimum image degradation in order to achieve photographing with high image quality. However, attempting to make a taking lens apparatus compact by reducing the weight and size of a taking lens system makes it difficult to maintain satisfactory optical performance. To overcome this inconvenience and meet the above requirements, various types of zoom lens system have conventionally been proposed. For example, the following patent publications propose zoom lens systems in which, with a view to realizing a compact taking lens apparatus, the optical path is bent with a prism inserted between lens elements.

A. Japanese Patent Application Laid-Open No. H8-248318

B. U.S. Pat. No. 6,104,432

However, with the zoom lens systems proposed in these publications, it is difficult to meet all the requirements mentioned above simultaneously. For example, the zoom lens system proposed in Publication A has a four-unit zoom construction of a, from the object side thereof, positive-negative-positive-positive type, and includes a large number of lens elements, making it impossible to achieve satisfactory compactness along the optical axis. The same is true with the zoom lens systems proposed in Publication B, which also include a rather large number of lens elements including a prism, making it impossible to achieve satisfactory compactness.

SUMMARY OF THE INVENTION

An object of the present invention is to provide a taking lens apparatus incorporating a compact, high-zoom-ratio zoom lens system that is composed of a small number of optical members but that nevertheless offers satisfactory optical performance over the entire zoom range.

To achieve the above object, according to one aspect of the present invention, a taking lens apparatus is provided with: a zoom lens system that forms an optical image of an object at a variable magnification and that includes an aperture stop in the optical path; and an image sensor that has a light-receiving surface on which to receive the optical image formed by the zoom lens system and that converts the optical image into an electrical image signal to output the electrical image signal. Here, the zoom lens system is composed of ten or less optical members, of which one has a reflective surface that reflects a light beam in such a way that the optical axis is bent at substantially 90°. Moreover, the following conditions are fulfilled:

$$5 \leq ft/fw \leq 10$$

$$3 < |EPw|BFw < 22$$

where fw represents the focal length of the entire zoom lens system at the wide-angle end;

ft represents the focal length of the entire zoom lens system at the telephoto end;

EPw represents the axial distance from the image plane to the exit pupil at the wide-angle end W; and BFw represents the axial distance from the image-side surface of the most image-side lens element to the image plane IM at the wide-angle end W.

According to another aspect of the present invention, a camera incorporates a taking lens apparatus as described above.

BRIEF DESCRIPTION OF THE DRAWINGS

This and other objects and features of the present invention will become clear from the following description, taken in conjunction with the preferred embodiments with reference to the accompanying drawings in which:

FIGS. 9A to 9I are aberration diagrams of Example 1;

DESCRIPTION OF THE PREFERRED EMBODIMENTS

Hereinafter, taking lens apparatuses embodying the present invention will be described with reference to the drawings. A taking lens apparatus takes in an image of a subject optically and outputs it in the form of an electrical signal. A taking lens apparatus is used as a main component of a camera (for example, a digital camera, video camera, or camera incorporated in or externally fitted to a personal computer, mobile computer, cellular phone, personal digital assistant (PDA), peripheral device therefor (such as a mouse, scanner, printer, or other digital input/output device) or the like) that is used to photograph a still or moving picture of a subject. Incidentally, the term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component a taking lens apparatus provided with a taking lens system for forming an optical image, an image sensor for converting the optical image into an electrical signal, and other components, examples of such cameras including digital still cameras and digital movie cameras.

Figure 17:
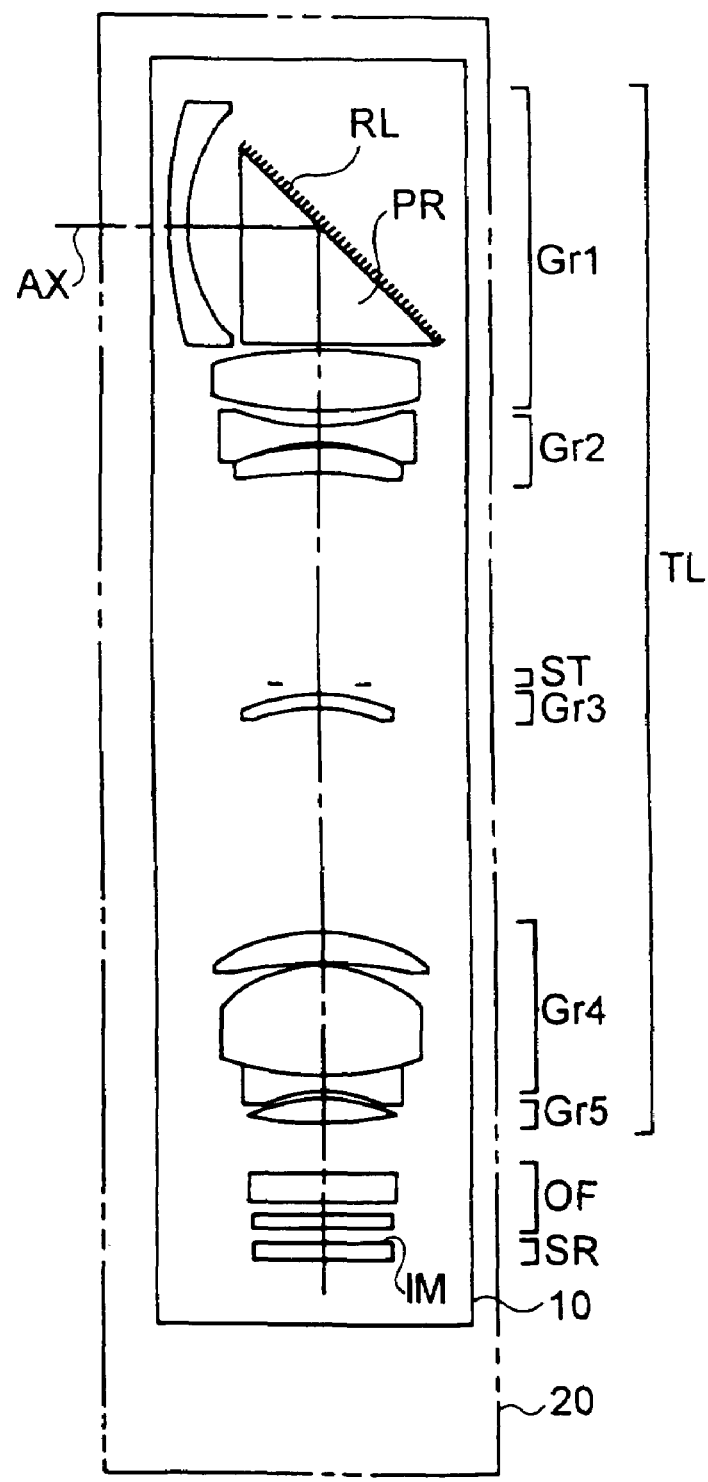
FIG. 17 is an outline construction diagram schematically showing how the first embodiment is used.

FIG. 17 shows an example of a taking lens apparatus 10 incorporated in a camera 20. This taking lens apparatus 10 is composed of, from the object (subject) side thereof, a zoom lens system TL corresponding to a taking lens system for forming an optical image (image plane IM) of a subject, a parallel-surface plate OF corresponding to an optical filter (for example, an optical low-pass filter or infrared cut filter), and an image sensor SR for converting the optical image formed by the zoom lens system TL into an electrical signal. When this taking lens apparatus 10 is incorporated in a digital camera, the taking lens apparatus 10 is usually arranged inside the body of the camera 20. Here, the camera function can be realized in a desired manner that suits particular needs. For example, the taking lens apparatus 10 may be built as a unit that is freely detachable from or freely rotatable relative to the body of the camera 20; or the taking lens apparatus 10 may be built as a unit that is freely detachable from or freely rotatable relative to a digital appliance such as a cellular phone or personal digital assistant.

Figure 1:
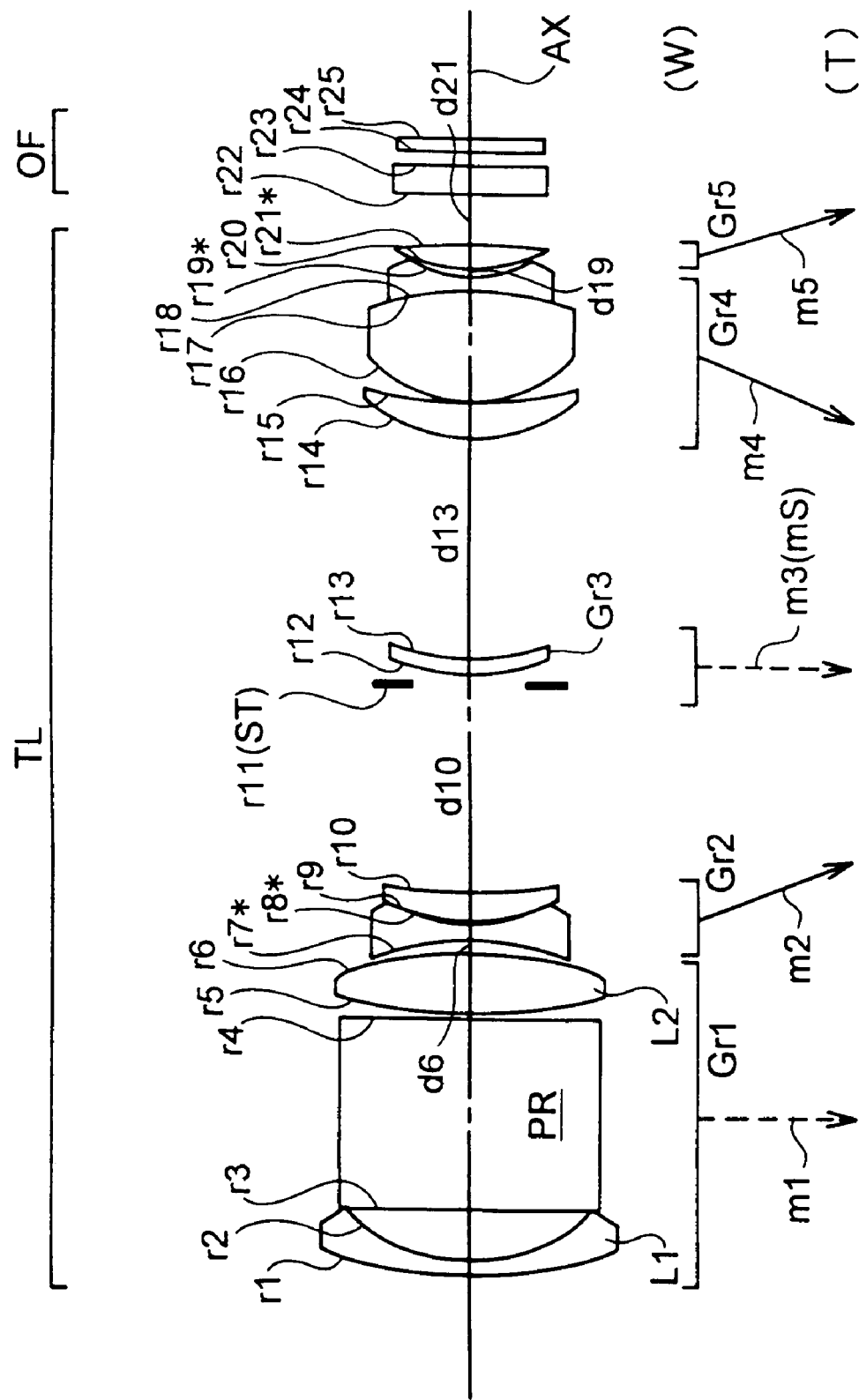
FIG. 1 is a lens construction diagram of a first embodiment (Example 1) of the invention.
Figure 2:
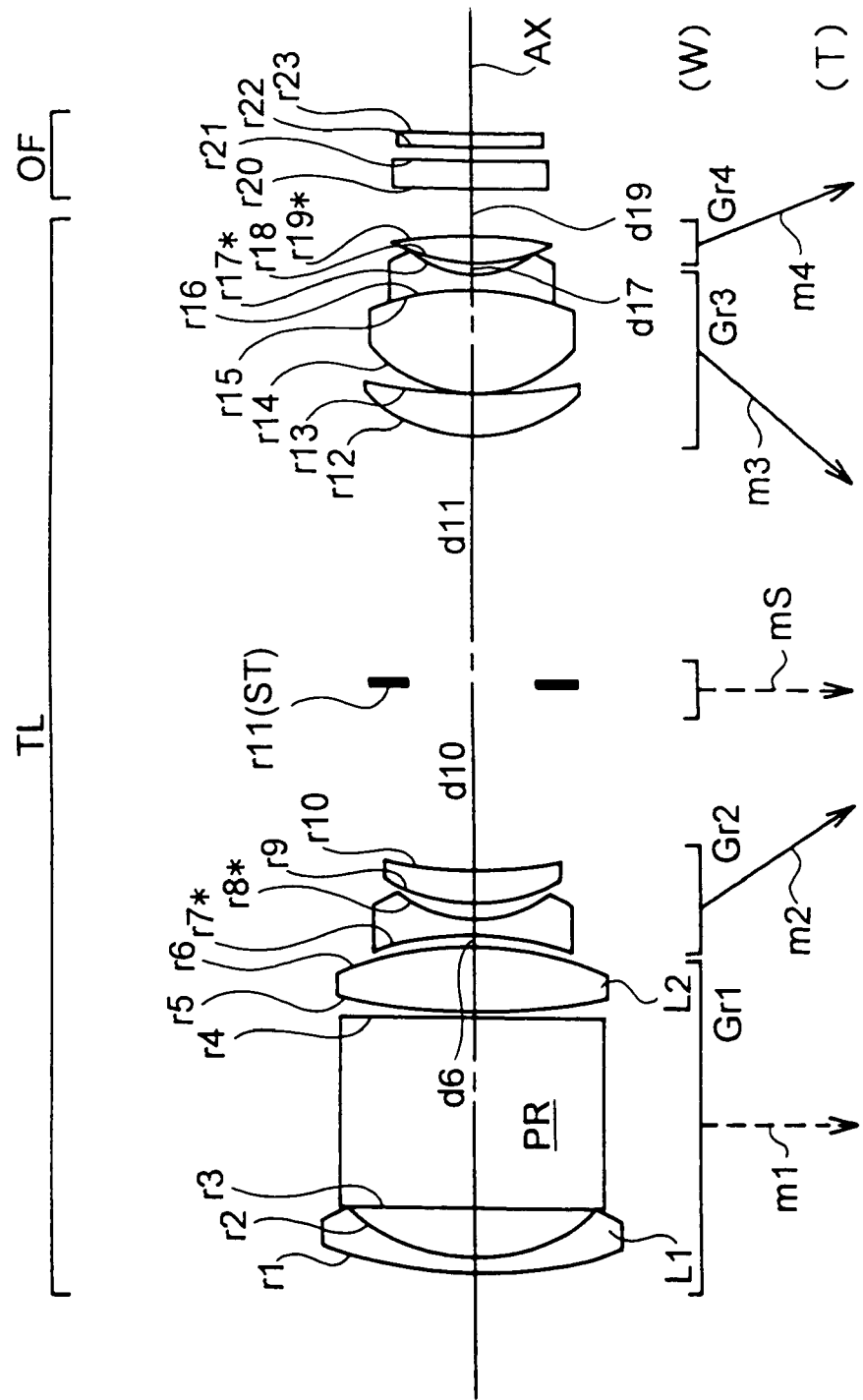
FIG. 2 is a lens construction diagram of a second embodiment (Example 2) of the invention.
Figure 3:
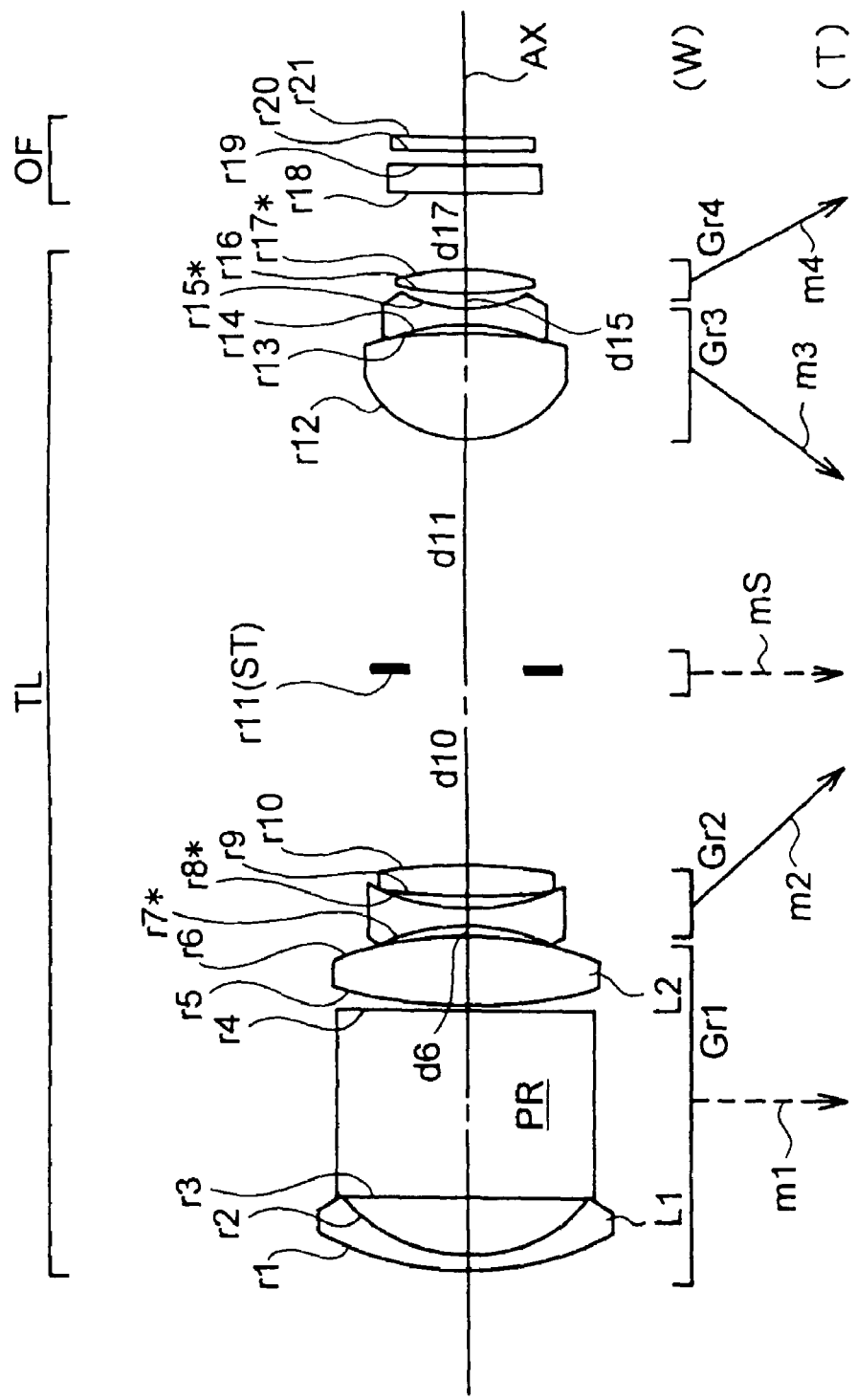
FIG. 3 is a lens construction diagram of a third embodiment (Example 3) of the invention.
Figure 4:
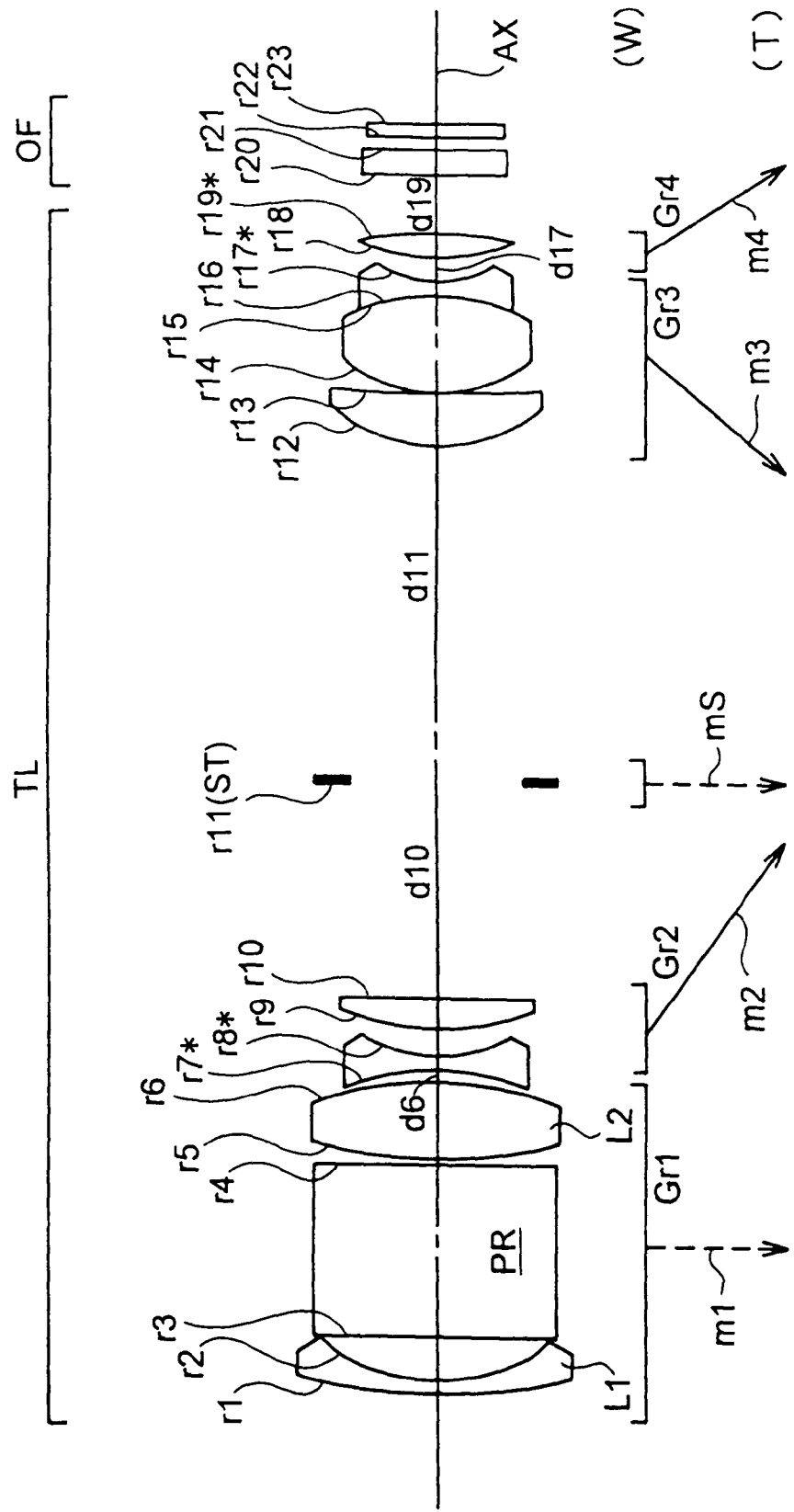
FIG. 4 is a lens construction diagram of a fourth embodiment (Example 4) of the invention.
Figure 5:
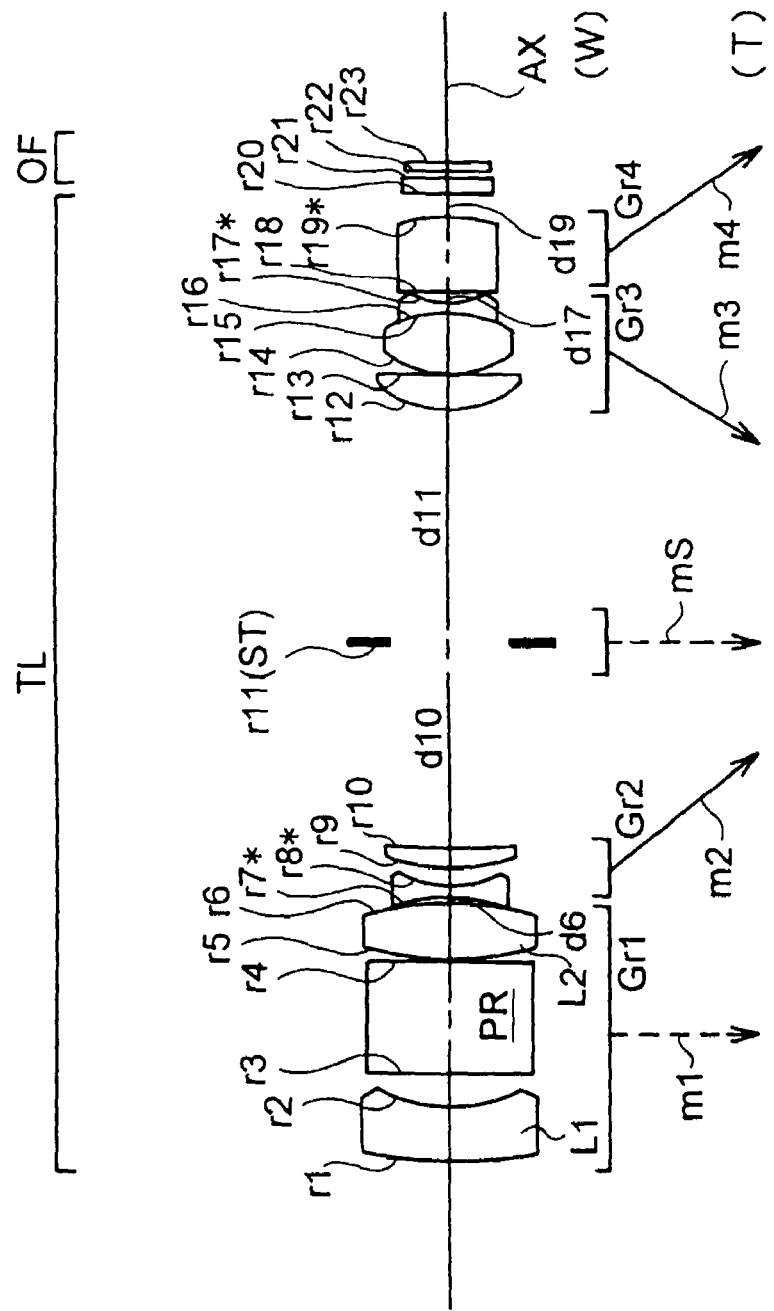
FIG. 5 is a lens construction diagram of a fifth embodiment (Example 5) of the invention.
Figure 6:
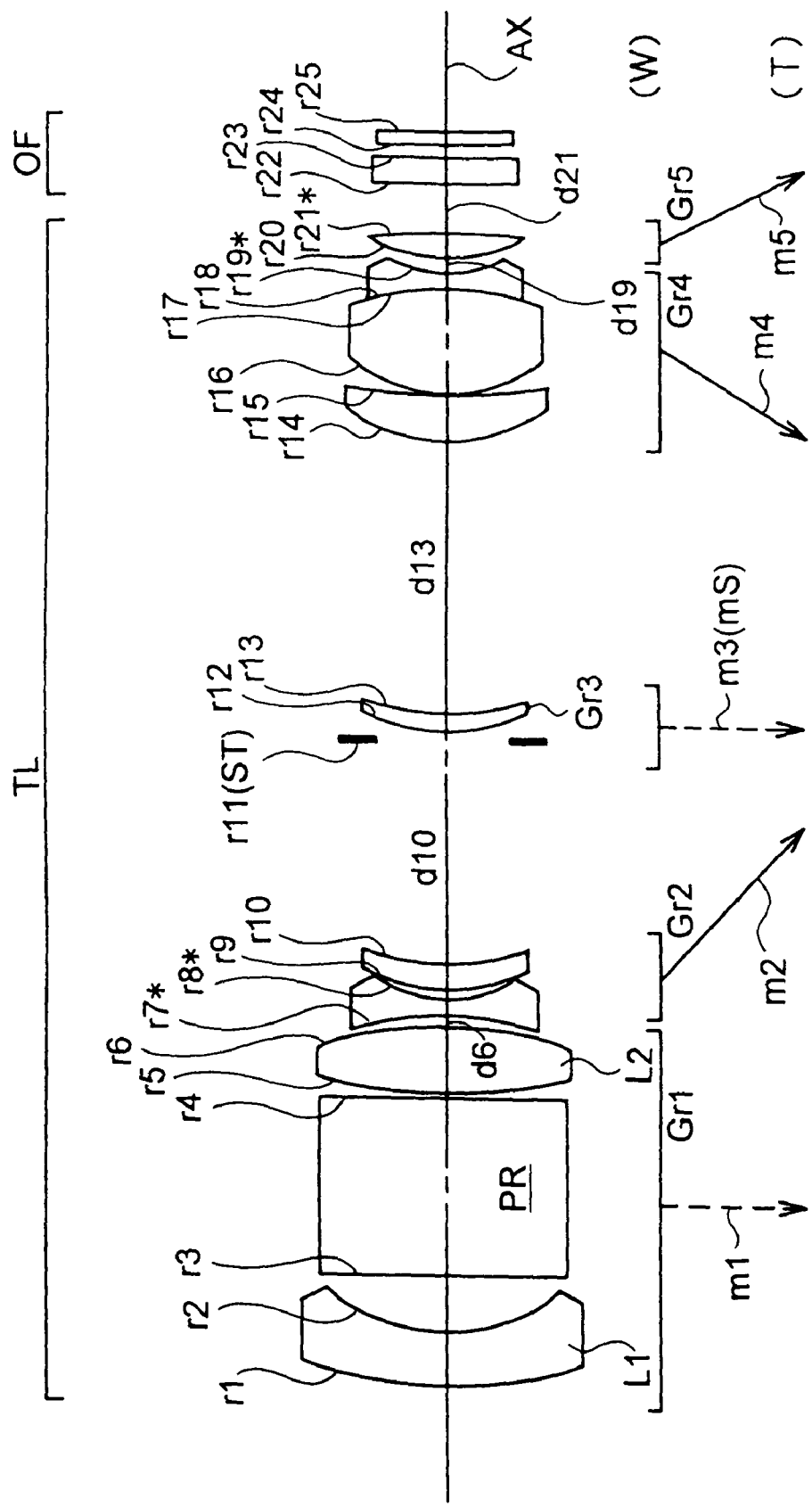
FIG. 6 is a lens construction diagram of a sixth embodiment (Example 6) of the invention.
Figure 7:
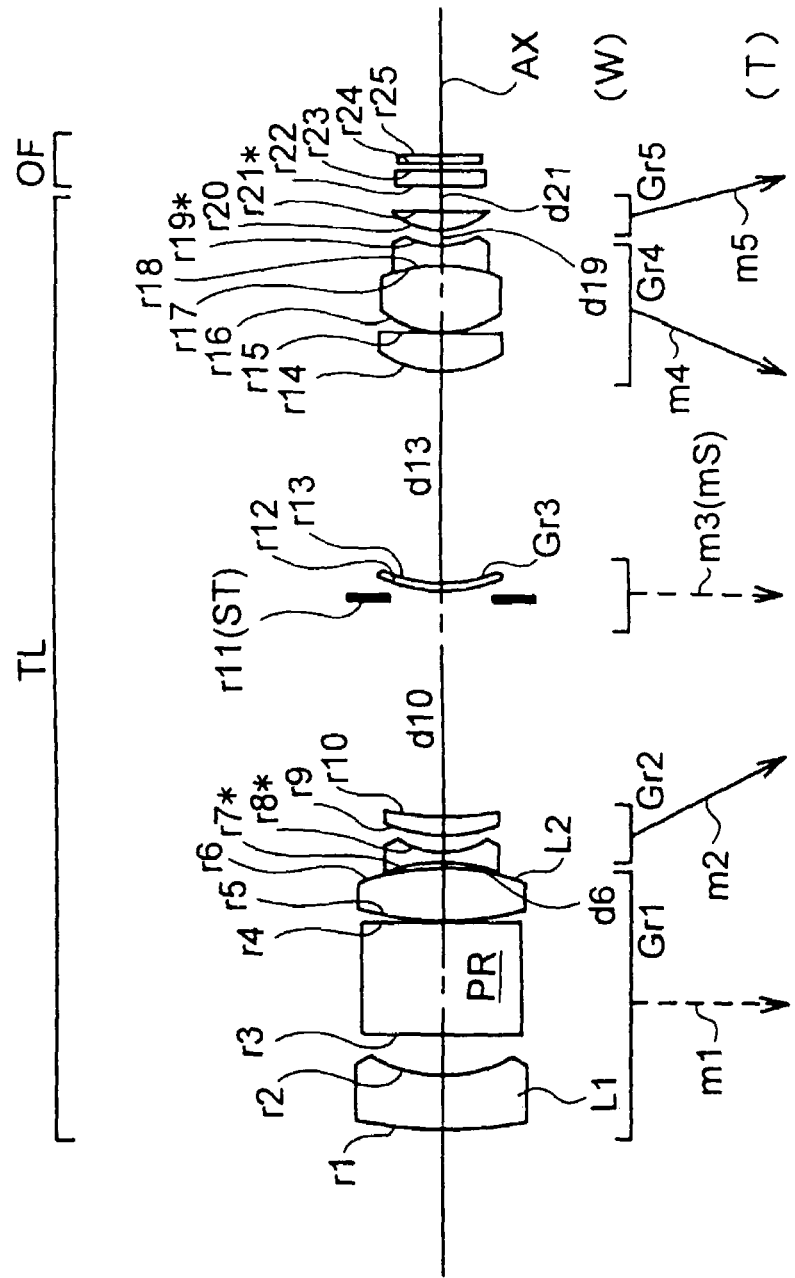
FIG. 7 is a lens construction diagram of a seventh embodiment (Example 7) of the invention.
Figure 8:
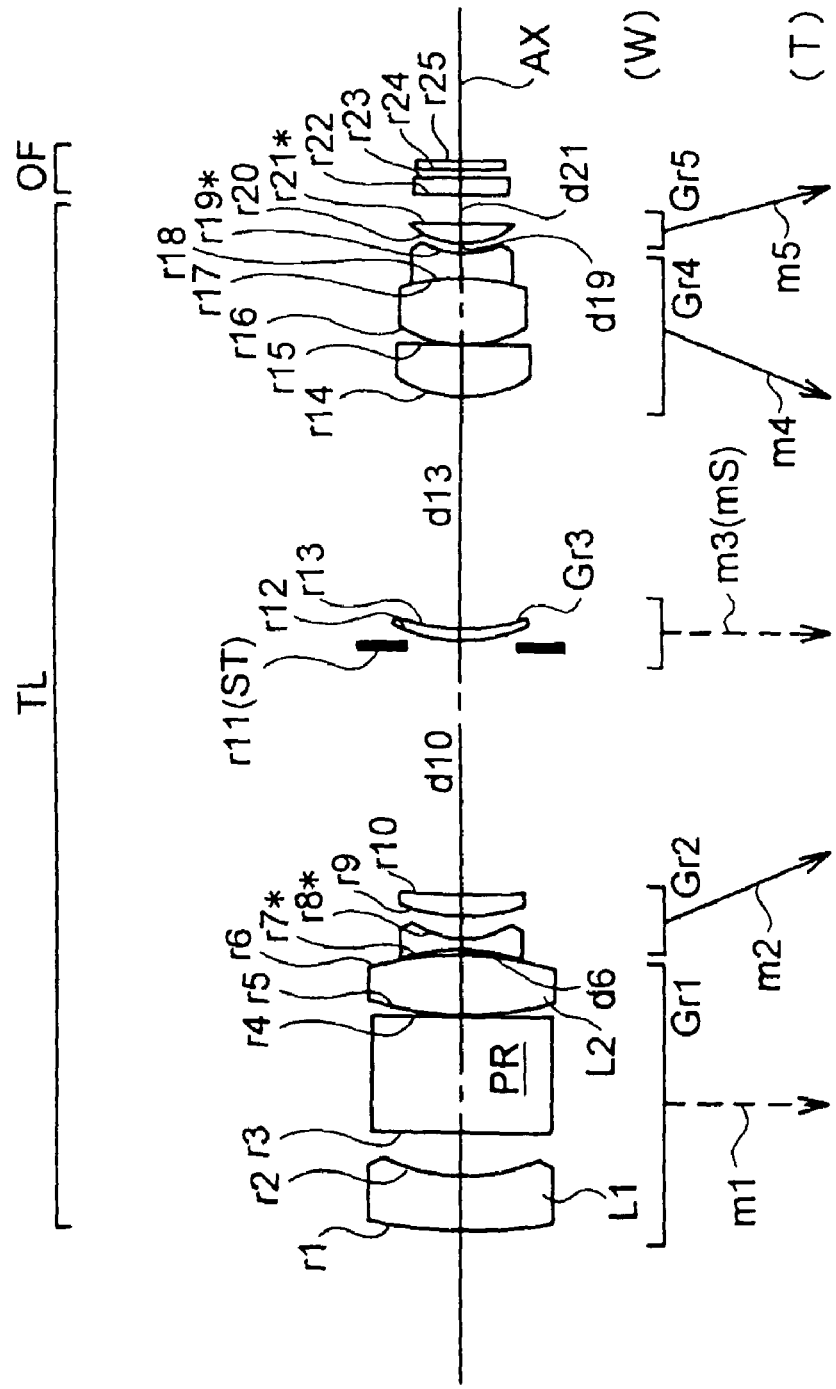
FIG. 8 is a lens construction diagram of an eighth embodiment (Example 8) of the invention.
Figure 10A:
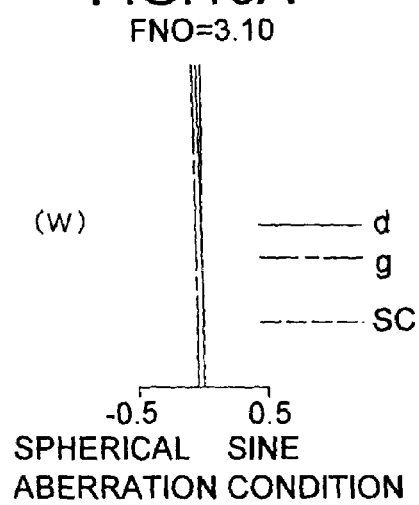
FIGS. 10A to 10I are aberration diagrams of Example 2.
Figure 10B:
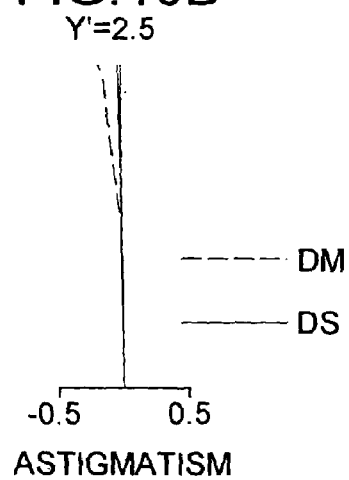
Figure 10C:
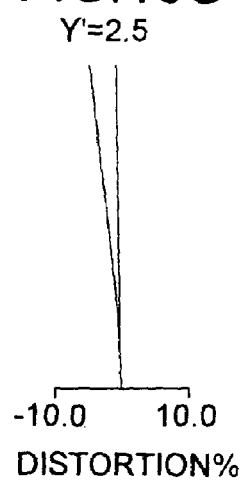
Figure 10D:
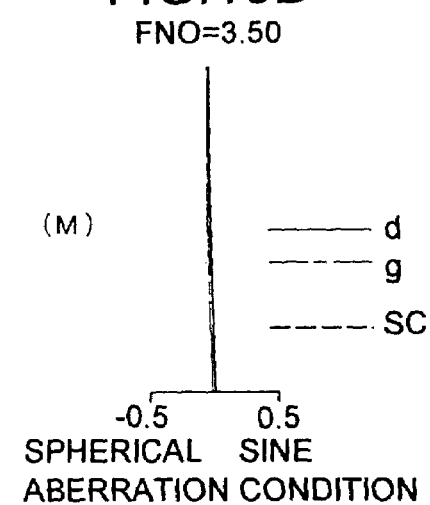
Figure 10E:
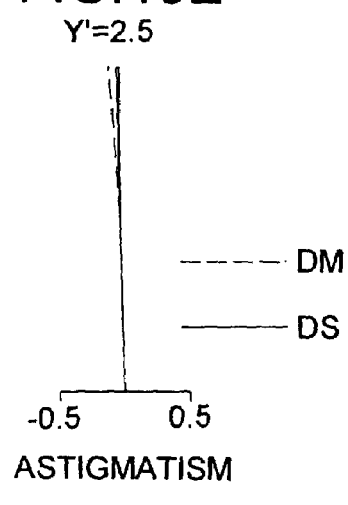
Figure 10F:
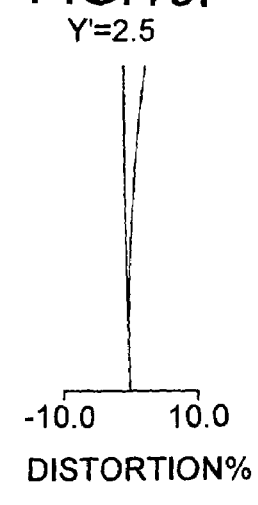
Figure 10G:
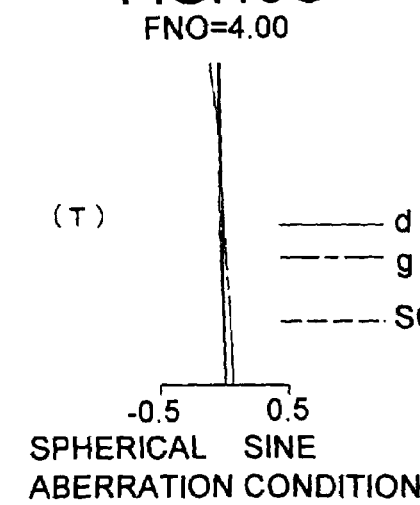
Figure 10H:
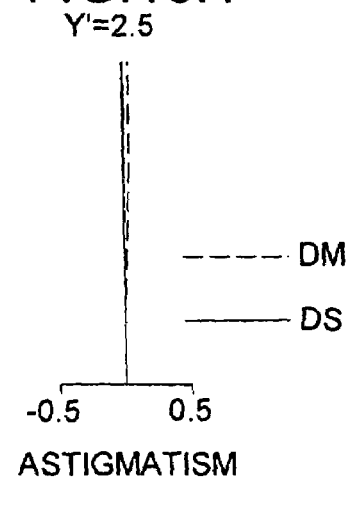
Figure 10I:
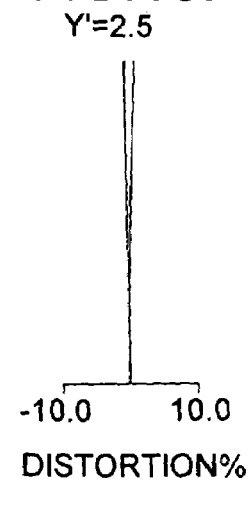
Figure 11A:
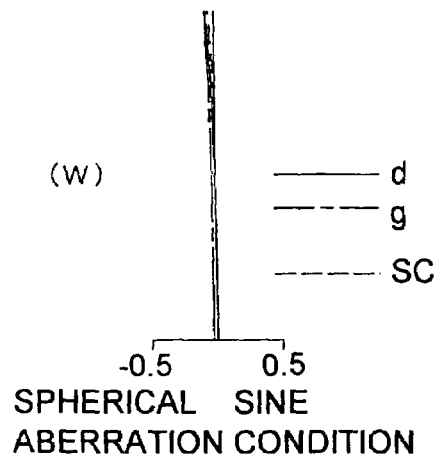
FIGS. 11A to 11I are aberration diagrams of Example 3.
Figure 11B:
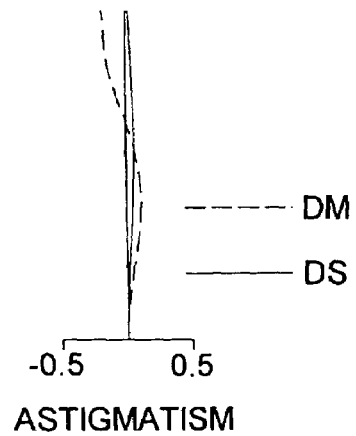
Figure 11C:
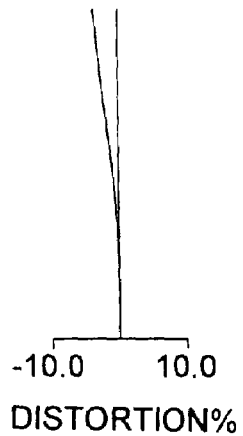
Figure 11D:
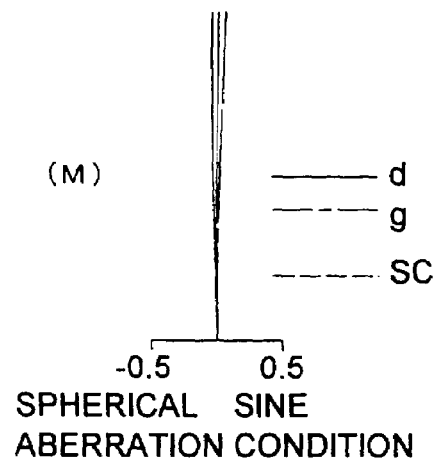
Figure 11E:
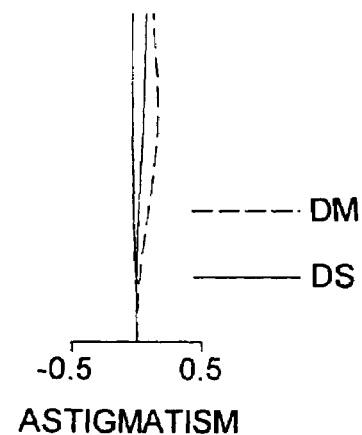
Figure 11F:
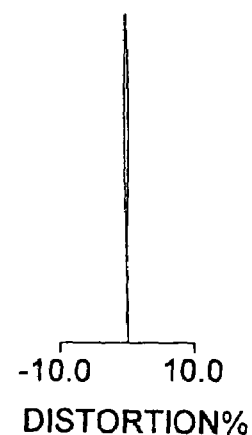
Figure 11G:
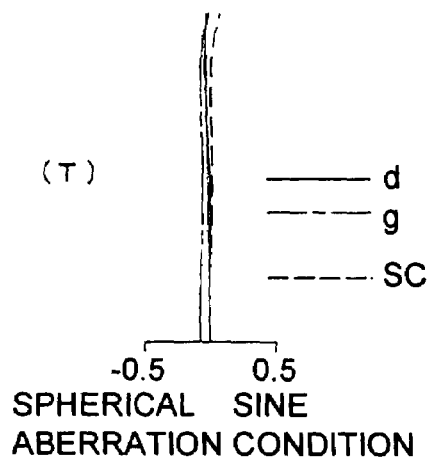
Figure 11H:
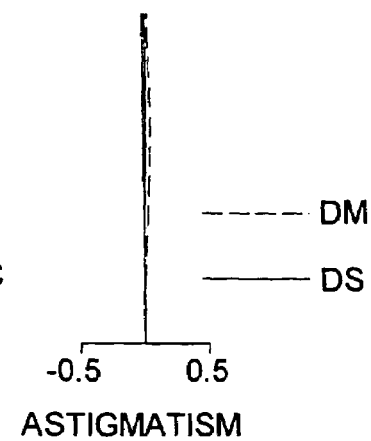
Figure 11I:
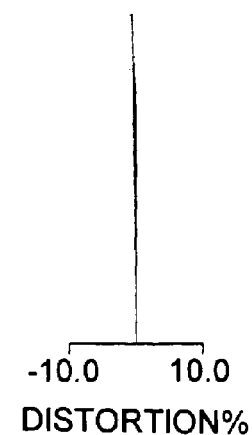
Figure 12A:
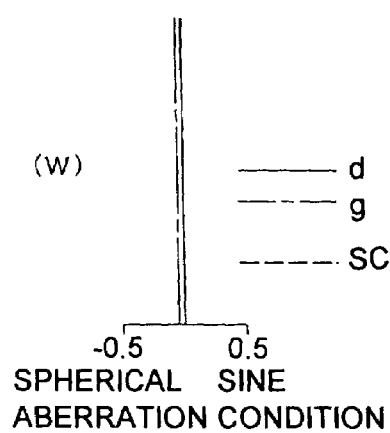
FIGS. 12A to 12I are aberration diagrams of Example 4.
Figure 12B:
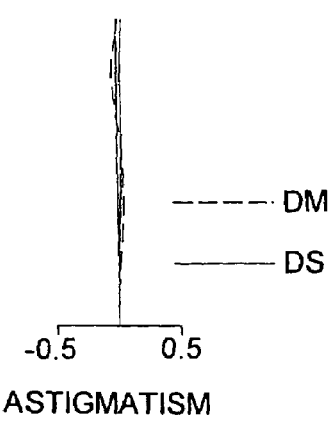
Figure 12C:
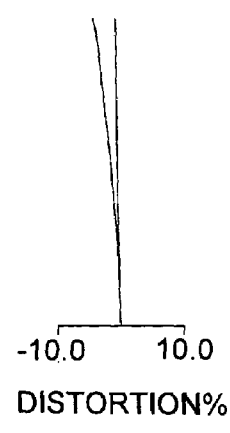
Figure 12D:
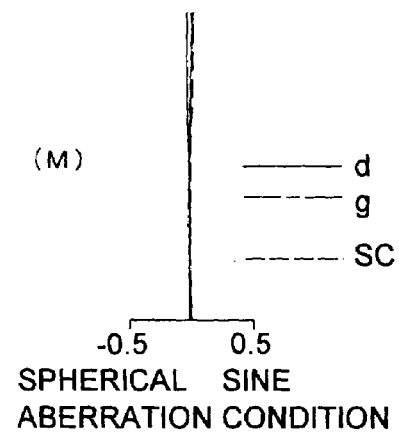
Figure 12E:
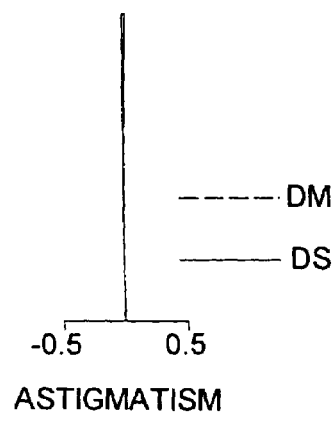
Figure 12F:
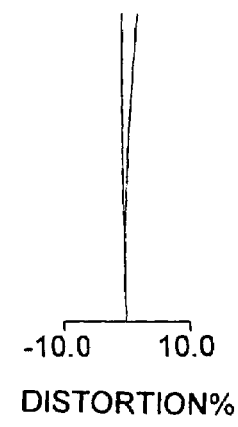
Figure 12G:
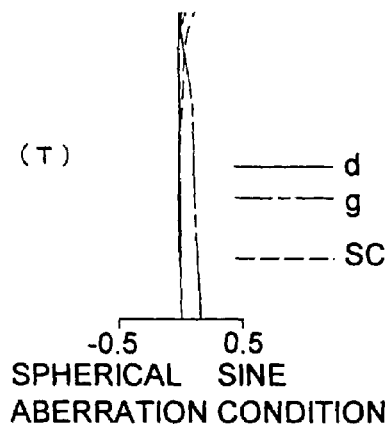
Figure 12H:
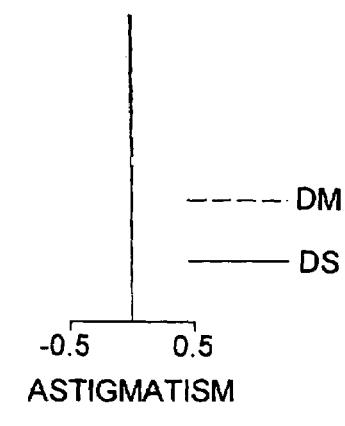
Figure 12I:
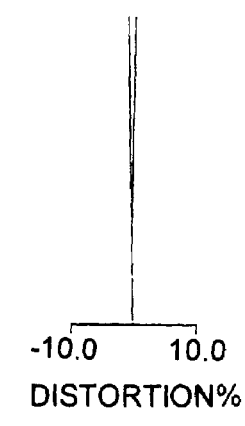
Figure 13A:
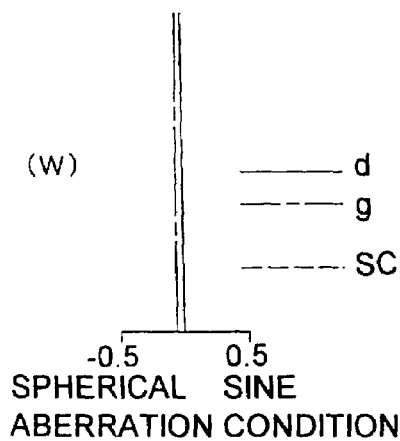
FIGS. 13A to 13I are aberration diagrams of Example 5.
Figure 13B:
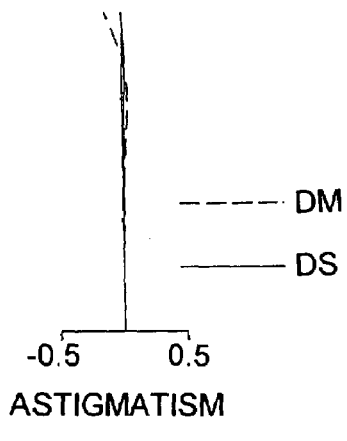
Figure 13C:
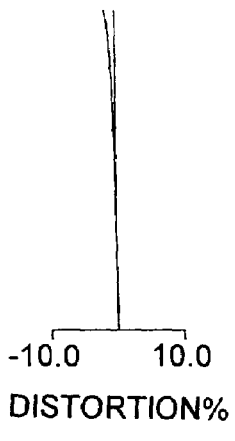
Figure 13D:
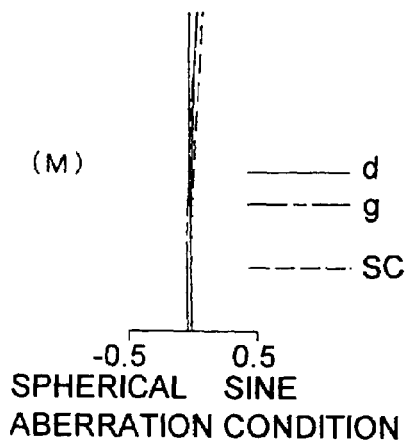
Figure 13E:
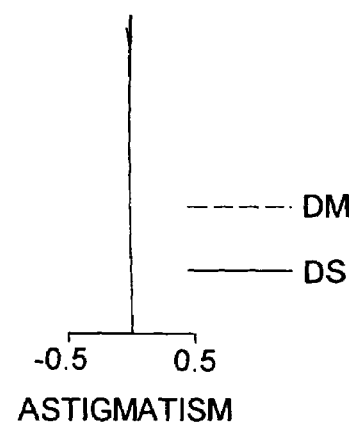
Figure 13F:
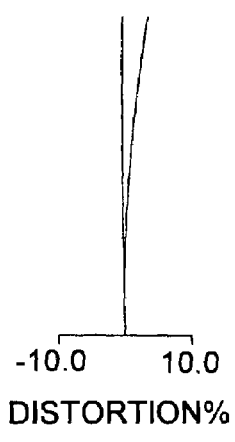
Figure 13G:
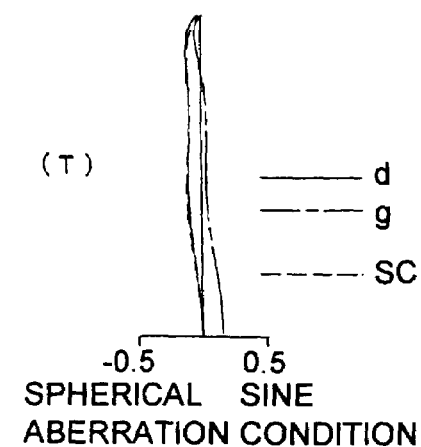
Figure 13H:
Figure 13I:
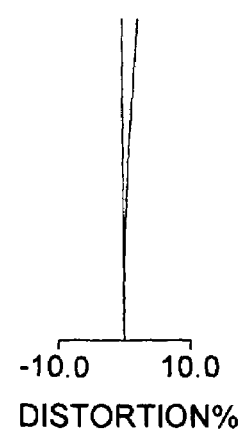
Figure 14A:
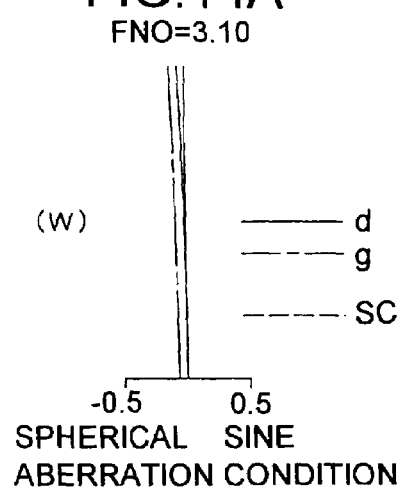
FIGS. 14A to 14I are aberration diagrams of Example 6.
Figure 14B:
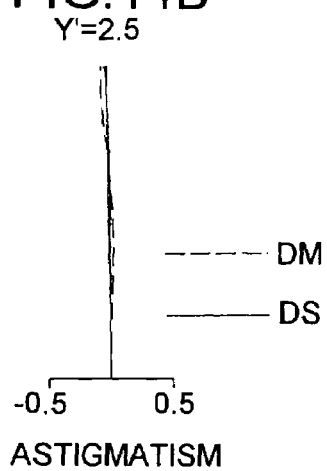
Figure 14C:
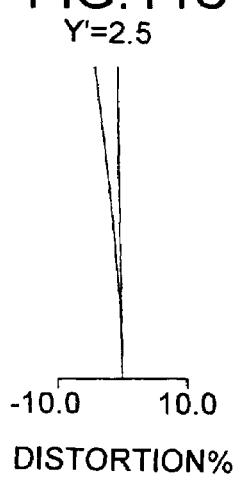
Figure 14D:
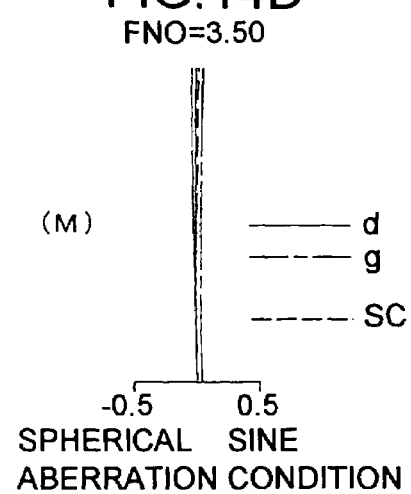
Figure 14E:
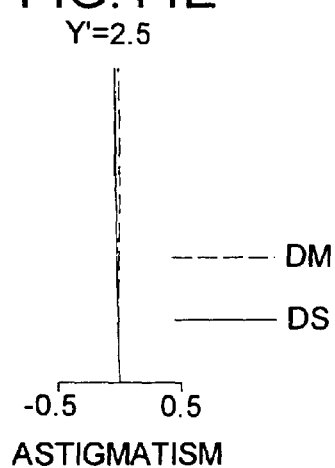
Figure 14F:
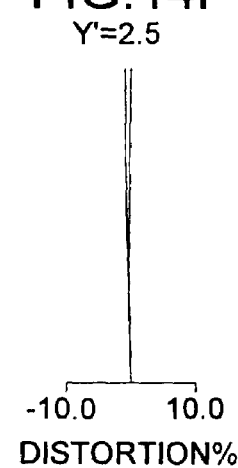
Figure 14G:
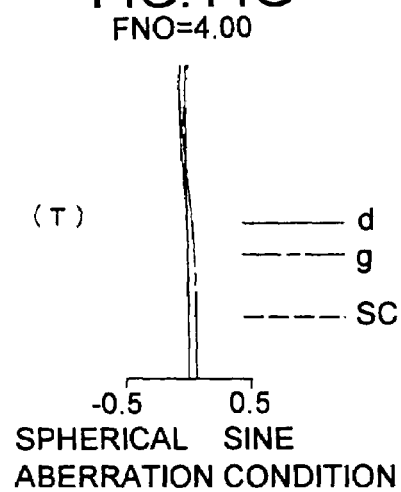
Figure 14H:
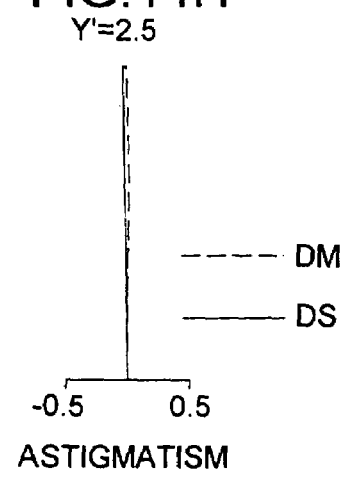
Figure 14I:
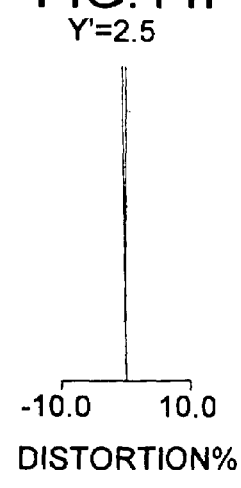
Figure 15A:
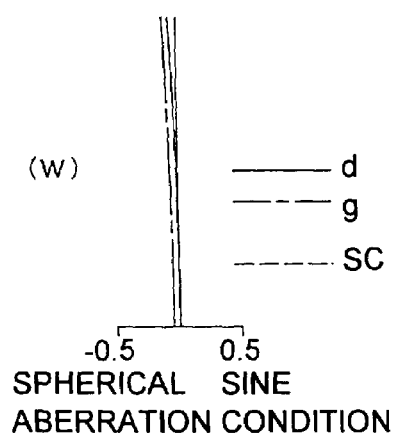
FIGS. 15A to 15I are aberration diagrams of Example 7.
Figure 15B:
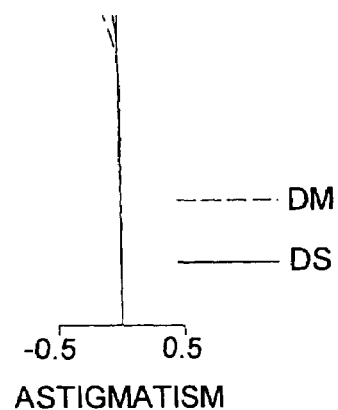
Figure 15C:
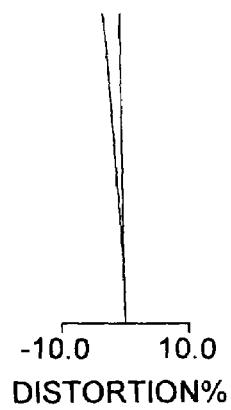
Figure 15D:
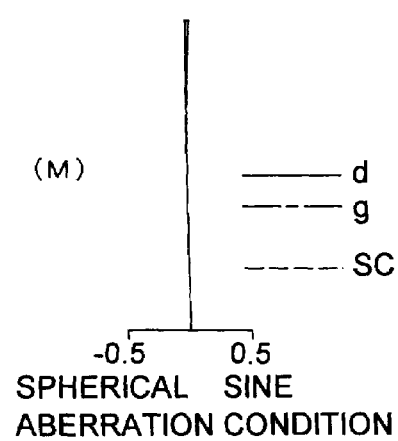
Figure 15E:
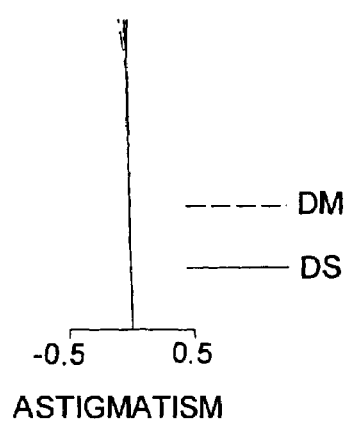
Figure 15F:
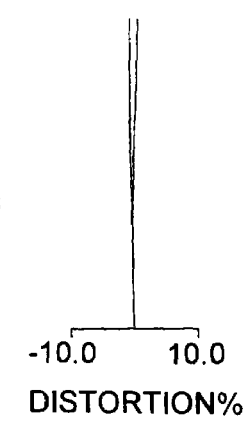
Figure 15G:
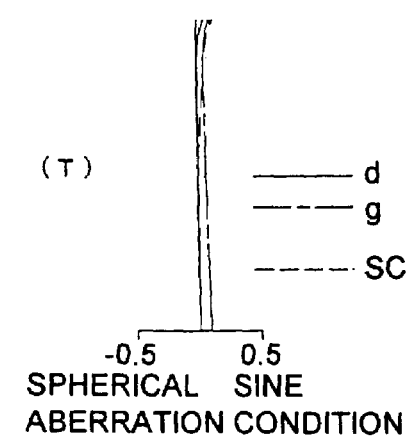
Figure 15H:
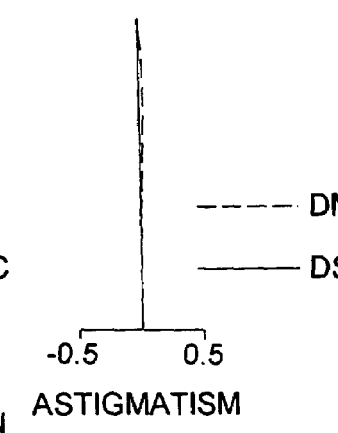
Figure 15I:
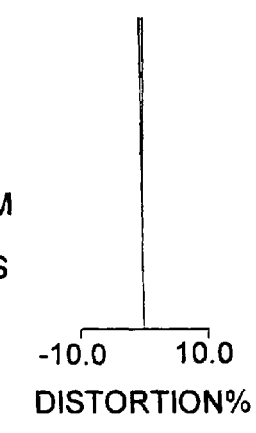
Figure 16A:
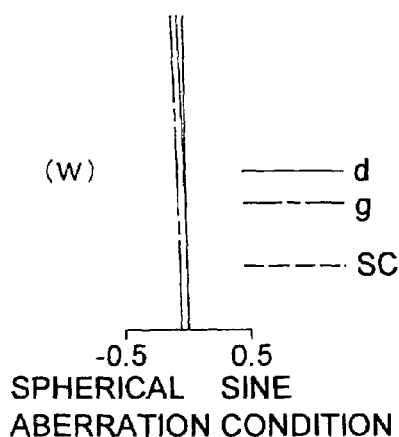
FIGS. 16A to 16I are aberration diagrams of Example 8.
Figure 16B:
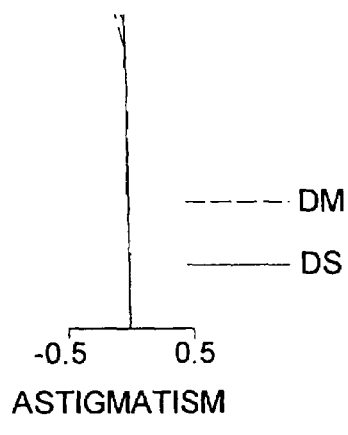
Figure 16C:
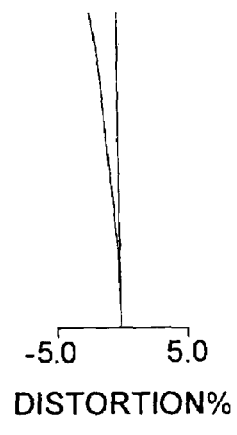
Figure 16D:
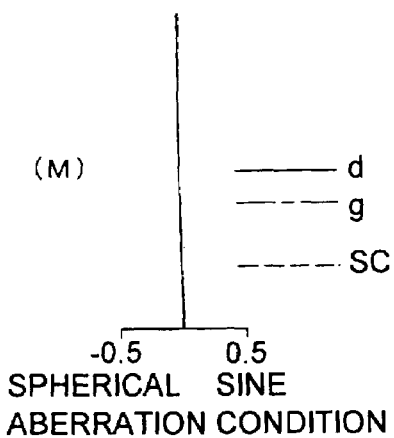
Figure 16E:
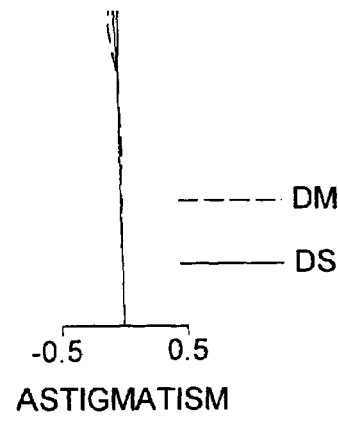
Figure 16F:
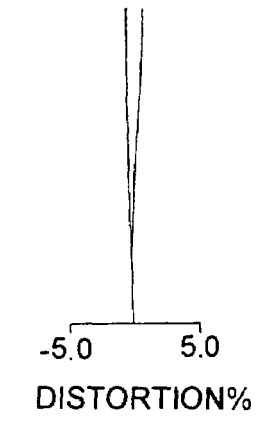
Figure 16G:
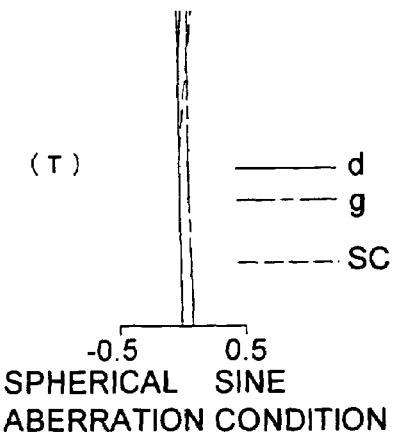
Figure 16H:
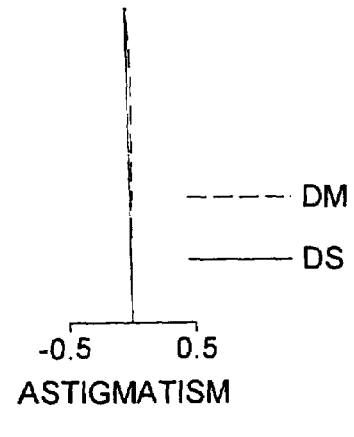
Figure 16I:
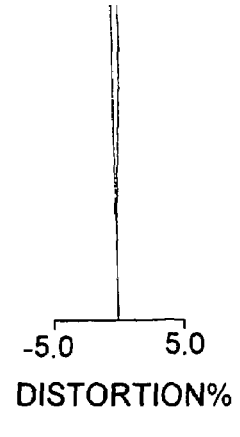

The zoom lens system TL is composed of a plurality of lens units, and achieves zooming (i.e., varies the photographing magnification) by moving those lens units along the optical axis AX in such a way that the distances between them vary (i.e., has the same lens construction as that shown in FIG. 1, which will be described later). In the middle of the optical path through the zoom lens system TL, a flat reflective surface RL is disposed, and at least one lens element is disposed on each of the front and rear sides of the prism PR with which the reflective surface RL is realized. The reflective surface RL bends the optical path so that the zoom lens system TL is used as a bending optical system; specifically, it reflects a light beam in such a way that the optical axis AX is bent at substantially 90° (i.e., precisely or approximately 90°). The reflective surface RL may be realized with any other reflective member than a prism PR such as a rectangular prism; for example, it may be realized with a mirror such as a flat mirror.

Used as the image sensor SR is, for example, a solid-state image sensor such as a CCD (charge-coupled device) or a CMOS (complementary metal-oxide semiconductor) sensor composed of a plurality of pixels. The optical image formed by the zoom lens system TL is converted into an electrical signal by the image sensor SR. The signal produced by the image sensor SR is subjected to predetermined digital image processing, image compression processing, and the like as necessary, and is recorded in a memory (such as a semiconductor memory or an optical disk) as a digital video signal; in some cases, the signal is transferred to another device through a cable or after being converted into an infrared signal.

The optical image to be formed by the zoom lens system TL passes through the optical low-pass filter (corresponding to the parallel-surface plate OF) having a predetermined cut-off frequency characteristic that depends on the pixel pitch of the image sensor SR, and meanwhile the optical image has its spatial frequency characteristic so adjusted as to minimize so-called aliasing noise generated when the optical image is converted into an electrical signal. This helps suppress color moiré. Used as the optical low-pass filter is a birefringence-type low-pass filter, phase-type low-pass filter, or low-pass filter of any other type. Examples of birefringence-type low-pass filters include those made of a birefringent material such as quartz having an appropriately aligned crystal axis and those composed of wavelength plates or the like, which change the polarization plane, laid on one another. Examples of phase-type low-pass filters include those that achieve required optical cut-off frequency characteristics by exploiting diffraction.

In the taking lens apparatus 10 shown in FIG. 17, the zoom lens system TL performs reduction-projection from the subject located on the enlargement side (with a longer conjugate distance) to the image sensor SR located on the reduction side (with a shorter conjugate distance). It is, however, also possible to use instead of the image sensor SR a display device (for example, a liquid crystal display device) that displays a two-dimensional image, and use the zoom lens system TL as a projection lens system. In this way, it is possible to realize an image projection apparatus that performs enlargement-projection from the image display surface located on the reduction side to a screen surface located on the enlargement side. That is, the zoom lens systems TL of the embodiments described below can be suitably used not only as a taking lens system TL but also as a projection lens system.

FIGS. 1 to 8 are lens construction diagrams corresponding to the zoom lens systems of a first to an eighth embodiment, respectively, of the invention, each showing the lens arrangement observed at the wide-angle end W in an optical section. In each lens construction diagram, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, through only those axial distances which vary as zooming is performed, i.e., variable axial distances, are shown here. In each lens construction diagram, arrows mj (j=1, 2, . . . ) and mS schematically indicate the movement of the j-th lens unit Grj and the aperture stop ST, respectively, during zooming from the wide-angle end W to the telephoto end T. Of these arrows, those indicated with a broken line indicate that the lens unit or aperture stop in question is kept stationary during zooming. In each lens construction diagram, the prism PR is shown as a parallel-surface plate, i.e., in a form straightened along the optical axis AX.

In the first and sixth to eighth embodiments, the zoom lens system TL is a five-unit zoom lens system that is composed of, from the object side thereof, a first lens unit Gr1 having a positive optical power, a second lens unit Gr2 having a negative optical power, a third lens unit Gr3 having a positive optical power, a fourth lens unit Gr4 having a positive optical power, and a fifth lens unit Gr5 having a positive optical power (here, the optical power is a quantity defined as the reciprocal of the focal length), and that achieves zooming by moving, as movable lens units, the second, fourth, and fifth lens units Gr2, Gr4, and Gr5 in such a way as to vary the distances between individual lens units. In the second to fifth embodiments, the zoom lens system TL is a four-unit zoom lens system that is composed of, from the object side thereof, a first lens unit Gr1 having a positive optical power, a second lens unit Gr2 having a negative optical power, a third lens unit Gr3 having a positive optical power, and a fourth lens unit Gr4 having a positive optical power, and that achieves zooming by moving, as movable lens units, the second, third, and fourth lens units Gr2, Gr3, and Gr4 in such a way as to vary the distances between individual lens units. In all the embodiments, on the image side of the zoom lens system TL are arranged two glass parallel-surface plates OF that correspond to the optical filter mentioned earlier.

In all the embodiments, during zooming from the wide-angle end W to the telephoto end T, the second lens unit Gr2 moves toward the image side. That is, during zooming from the wide-angle end W to the telephoto end T, the second lens unit Gr2 moves from the object side to the image side and thereby varies its position relative to the image plane IM (FIG. 17). Moreover, in all the embodiments, during zooming from the wide-angle end W to the telephoto end T, the most image-side lens unit moves toward the image side, and the lens unit disposed adjacently on the object side of that lens unit moves toward the object side. That is, during zooming from the wide-angle end W to the telephoto end T, in the first and sixth to eighth embodiments, the fourth lens unit Gr4 moves from the image side to the object side and the fifth lens unit Gr5 moves from the object side to the image side, and thereby these lens units vary their position relative to the image plane IM; in the second to fifth embodiments, the third lens unit Gr3 moves from the image side to the object side and the fourth lens unit Gr4 moves from the object side to the image side, and thereby these lens units vary their position relative to the image plane IM.

In all the embodiments, the first lens unit Gr1 is a stationary lens unit, and thus, during zooming from the wide-angle end W to the telephoto end T, remains stationary relative to the image plane IM. In the first and sixth to eighth embodiments, the third lens unit Gr3 also is a stationary lens unit, and thus, during zooming from the wide-angle end W to the telephoto end T, remains stationary relative to the image plane IM. Moreover, in all the embodiments, an aperture stop ST is disposed between the second and third lens units Gr2 and Gr3. In all the embodiments, the aperture stop ST remains stationary during zooming, and thus, during zooming from the wide-angle end W to the telephoto end T, remains stationary relative to the image plane IM. Now, the lens construction of each embodiment will be described in more detail.

In the first embodiment (FIG. 1), the zoom lens system has a five-unit zoom construction of a positive-negative-positive-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive meniscus lens element convex to the object side. The third lens unit Gr3 is composed solely of a positive meniscus lens element convex to the object side. The fourth lens unit Gr4 is composed of, from the object side thereof, a positive meniscus lens element convex to the object side and a cemented lens element formed by cementing together a positive biconvex lens element and a negative biconcave lens element (having an aspherical surface on the image side). The fifth lens unit Gr5 is composed solely of a positive biconvex lens element (having an aspherical surface on the image side). In this embodiment, the zoom lens system TL is composed of ten optical members. Specifically, it has nine lens elements as optical elements having an optical power and one prism PR as an optical element having no optical power (here, the aperture stop ST is excluded).

In the second embodiment (FIG. 2), the zoom lens system has a four-unit zoom construction of a positive-negative-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive meniscus lens element convex to the object side. The third lens unit Gr3 is composed of, from the object side thereof, a positive meniscus lens element convex to the object side and a cemented lens element formed by cementing together a positive biconvex lens element and a negative biconcave lens element (having an aspherical surface on the image side). The fourth lens unit Gr4 is composed solely of a positive biconvex lens element (having an aspherical surface on the image side). In this embodiment, the zoom lens system TL is composed of nine optical members. Specifically, it has eight lens elements as optical elements having an optical power and one prism PR as an optical element having no optical power (here, the aperture stop ST is excluded).

In the third embodiment (FIG. 3), the zoom lens system has a four-unit zoom construction of a positive-negative-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive biconvex lens element. The third lens unit Gr3 is composed of, from the object side thereof, a positive biconvex lens element and a negative biconcave lens element (having an aspherical surface on the image side). The fourth lens unit Gr4 is composed solely of a positive biconvex lens element (having an aspherical surface on the image side). In this embodiment, the zoom lens system TL is composed of eight optical members. Specifically, it has seven lens elements as optical elements having an optical power and one prism PR as an optical element having no optical power (here, the aperture stop ST is excluded).

In the fourth embodiment (FIG. 4), the zoom lens system has a four-unit zoom construction of a positive-negative-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive meniscus lens element convex to the object side. The third lens unit Gr3 is composed of, from the object side thereof, a positive meniscus lens element convex to the object side and a cemented lens element formed by cementing together a positive biconvex lens element and a negative biconcave lens element (having an aspherical surface on the image side). The fourth lens unit Gr4 is composed solely of a positive biconvex lens element (having an aspherical surface on the image side). In this embodiment, the zoom lens system TL is composed of nine optical members. Specifically, it has eight lens elements as optical elements having an optical power and one prism PR as an optical element having no optical power (here, the aperture stop ST is excluded).

In the fifth embodiment (FIG. 5), the zoom lens system has a four-unit zoom construction of a positive-negative-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive meniscus lens element convex to the object side. The third lens unit Gr3 is composed of, from the object side thereof, a positive meniscus lens element convex to the object side and a cemented lens element formed by cementing together a positive biconvex lens element and a negative biconcave lens element (having an aspherical surface on the image side). The fourth lens unit Gr4 is composed solely of a positive meniscus lens element convex to the image side (having an aspherical surface on the image side). In this embodiment, the zoom lens system TL is composed of nine optical members. Specifically, it has eight lens elements as optical elements having an optical power and one prism PR as an optical element having no optical power (here, the aperture stop ST is excluded).

In the sixth embodiment (FIG. 6), the zoom lens system has a five-unit zoom construction of a positive-negative-positive-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive meniscus lens element convex to the object side. The third lens unit Gr3 is composed solely of a positive meniscus lens element convex to the object side. The fourth lens unit Gr4 is composed of, from the object side thereof, a positive meniscus lens element convex to the object side and a cemented lens element formed by cementing together a positive biconvex lens element and a negative biconcave lens element (having an aspherical surface on the image side). The fifth lens unit Gr5 is composed solely of a positive biconvex lens element (having an aspherical surface on the image side). In this embodiment, the zoom lens system TL is composed of ten optical members. Specifically, it has nine lens elements as optical elements having an optical power and one prism PR as an optical element having no optical power (here, the aperture stop ST is excluded).

In the seventh embodiment (FIG. 7), the zoom lens system has a five-unit zoom construction of a positive-negative-positive-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive meniscus lens element convex to the object side. The third lens unit Gr3 is composed solely of a positive meniscus lens element convex to the object side. The fourth lens unit Gr4 is composed of, from the object side thereof, a positive meniscus lens element convex to the object side and a cemented lens element formed by cementing together a positive biconvex lens element and a negative biconcave lens element (having an aspherical surface on the image side). The fifth lens unit Gr5 is composed solely of a positive meniscus lens element convex to the object side (having an aspherical surface on the image side). In this embodiment, the zoom lens system TL is composed of ten optical members. Specifically, it has nine lens elements as optical elements having an optical power and one prism PR as an optical element having no optical power (here, the aperture stop ST is excluded).

In the eighth embodiment (FIG. 8), the zoom lens system has a five-unit zoom construction of a positive-negative-positive-positive-positive type, and its constituent lens units are each composed as follows. The first lens unit Gr1 is composed of, from the object side thereof, a first and a second lens element L1 and L2, with a prism PR inserted between the first and second lens elements L1 and L2. The first lens element L1 is a negative meniscus lens element concave to the image side. The prism PR is a rectangular prism having a reflective surface RL (FIG. 17) for bending the optical axis AX at 90°. The second lens element L2 is a positive biconvex lens element. The second lens unit Gr2 is composed of, from the object side thereof, a negative biconcave lens element (having aspherical surfaces on both sides) and a positive meniscus lens element convex to the object side. The third lens unit Gr3 is composed solely of a positive meniscus lens element convex to the object side. The fourth lens unit Gr4 is composed of, from the object side thereof, a positive meniscus lens element convex to the object side and a cemented lens element formed by cementing together a positive biconvex lens element and a negative biconcave lens element (having an aspherical surface on the image side). The fifth lens unit Gr5 is composed solely of a positive biconvex lens element (having an aspherical surface on the image side). In this embodiment, the zoom lens system TL is composed of ten optical members. Specifically, it has nine lens elements as optical elements having an optical power and one prism PR as an optical element having no optical power (here, the aperture stop ST is excluded).

As described above, in all the embodiments, the zoom lens system TL has, as a reflective member, a prism PR included in the first lens unit Gr1. The prism PR used in all the embodiments is a rectangular prism, and this prism PR provides the reflective surface RL (FIG. 17) mentioned above. That is, as shown in FIG. 17, the prism PR is so designed as to reflect a light beam with the reflective surface RL provided inside it in such a way that the optical axis AX of the zoom lens system TL is bent at substantially 90°. Incidentally, the prism PR may be of any other type than a rectangular prism; for example, it may be of the type that reflects a light beam with two or more reflective surfaces RL in such a way that the optical axis AX of the zoom lens system TL is bent at substantially 90°.

In a case, as in a conventional taking lens apparatus, where the optical elements, such as lens elements and aperture stop, constituting a zoom lens system are arranged linearly without changing the direction of the optical axis, the dimension of the taking lens apparatus in its thickness direction is practically determined by the distance from the most object-side optical element of the zoom lens system to an image sensor. On the other hand, as the image processing power of semiconductor devices and the like increases, taking lens apparatuses incorporated in personal computers, mobile computers, cellular phones, personal digital assistants, and the like have come to be required to offer increasingly high resolution, high magnification, and high image quality, as opposed to conventional simple types. Correspondingly, zoom lens systems for use in such taking lens apparatuses have come to include an increasingly large number of lens elements. This makes it difficult to achieve satisfactory slimness because of the thickness of lens elements even in the not-in-use state (i.e., a so-called collapsed state).

By contrast, as in the zoom lens systems TL of all the embodiments, adopting a construction in which the object light is reflected with a reflective surface RL so that the optical axis AX is bent at substantially 90° makes it possible to reduce the dimension of the taking lens apparatus 10 in its thickness direction down to the distance from the most object-side lens element, namely the first lens element L1, to the reflective surface RL. This helps make the taking lens apparatus 10 apparently slim and compact. Moreover, adopting a construction in which the optical axis AX is bent at substantially 90° with a reflective surface RL permits the optical path of the object light to have an overlap near the reflective surface RL. This makes it possible to effectively use space and thereby make the taking lens apparatus 10 more compact. In addition, the reduced number of constituent lens elements helps make the entire zoom lens system TL lightweight and compact.

In all the embodiments, the zoom lens system TL has a four- or five-unit zoom construction that achieves zooming by varying the distances between the individual lens units in such a way as to fulfill condition (0) below. Moreover, the zoom lens system TL is composed of ten or less optical members (with the aperture stop ST excluded), of which one, namely the prism PR, has a reflective surface RL that reflects a light beam in such a way as to bend the optical axis AX at 90° as described earlier.

$$5 \leq ft/fw \leq 10 \tag{0}$$

where
    fw represents the focal length of the entire zoom lens system TL at the wide-angle end W; and
    ft represents the focal length of the entire zoom lens system TL at the telephoto end T.

To achieve compactness with ten or less (more preferably nine or less) constituent optical members while achieving satisfactory optical performance over the entire zoom range with a zoom ratio of 5 to 10 as defined by condition (0) above, it is preferable that condition (1) below be fulfilled.

$$3 < |EPw|/BFw < 22 \tag{1}$$

where
    EPw represents the axial distance from the image plane IM to the exit pupil at the wide-angle end W; and
    BFw represents the axial distance from the image-side surface of the most image-side lens element to the image plane IM at the wide-angle end W.

Condition (1) defines the optimum position of the exit pupil to achieve compactness while maintaining high optical performance, in terms of its positional relationship with the back focal length BFw. The position of the exit pupil is given relative to the position of the image plane IM, with the positive direction running from the object side to the image side. If the value of |EPw|/BFw is smaller than the lower limit of condition (1), the distance from the exit pupil to the image plane IM is too short, and thus rays are incident on the image plane IM at too sharp angles of incidence, resulting in low peripheral brightness. By contrast, if the value of |EPw|/BFw is greater than the upper limit of condition (1), it is difficult to make the taking lens apparatus 10 compact in its length direction.

It is more preferable that condition (1a) below be fulfilled. Condition (1a) defines, within the conditional range defined by condition (1) above, a more preferable conditional range from the viewpoints noted above.

$$3 < |EPw|/BFw < 15 \tag{1a}$$

In a zoom lens system TL that is so constructed as to bend the optical axis AX at substantially 90° with a reflective surface RL, it is preferable that condition (2) below be fulfilled.

$$1 < D/fw < 5 \tag{2}$$

where
    D represents the axial distance from the most object-side surface to the reflective surface RL; and
    fw represents the focal length of the entire zoom lens system TL at the wide-angle end W.

Condition (2) defines the optimum condition to make the taking lens apparatus 10 apparently slim. If the value of D/fw is smaller than the lower limit of condition (2), the composite optical power of the surfaces located on the object side of the reflective surface RL is so strong that it is difficult to satisfactorily correct distortion. By contrast, if the value of D/fw is greater than the upper limit of condition (2), it is difficult to make the taking lens apparatus 10 apparently slim.

It is more preferable that condition (2a) below be fulfilled. Condition (2a) defines, within the conditional range defined by condition (2) above, a more preferable conditional range from the viewpoints noted above.

$$1 < D/fw < 4 \tag{2a}$$

In all the embodiments, used as the prism PR is an internal-reflection prism; however, it is also possible to use a prism of any other type. As the reflective member that provides the reflective surface RL, it is possible to use any of a surface-reflection prism, an internal-reflection flat mirror, a surface-reflection flat mirror, and the like. While an internal-reflection prism reflects the object light inside itself, a surface-reflection prism reflects the object light with a surface thereof serving as the reflective surface RL without letting the object light enter it. On the other hand, while a surface-reflection flat mirror reflects the object light with a mirror surface thereof serving as the reflective surface RL, an internal-reflection flat mirror reflects, with the back surface of a glass plate serving as the reflective surface RL, the object light that has entered the glass plate.

Of the different types of reflective member mentioned above, the internal-reflection prism is most suitable to make the taking lens apparatus 10 and the camera 20 slim. In a case where an internal-reflection prism is adopted, the object light passes through the medium of the prism and thus travels a physically shorter axial distance than otherwise. Thus, it is preferable to realize the reflective surface RL with an internal-reflection prism, because it helps realize an optically equivalent construction with less space. The reflective surface RL does not have to be a perfectly total-reflection surface. That is, the reflectivity of part of the reflective surface RL may be appropriately adjusted so as to make part of the object light branch off and strike a sensor for metering or distance measurement. The reflectivity of the entire reflective surface RL may be adjusted appropriately so as to split the object light into two beams and direct one to a viewfinder.

In all the embodiments, the entrance-side surface and exit-side surface of the prism PR are both flat; however, the entrance-side and exit-side surfaces of the reflective member may be given an optical power. That is, in all the embodiments, at least one of the entrance-side and exit-side surfaces of the prism PR may be given a curvature. The optical power of such a surface may be derived not only from refraction, but from diffraction, or refraction and diffraction combined together. Instead of the reflective surface RL, a refractive or diffractive surface may be used to bend the optical axis AX. The reflective surface RL itself of the reflective member may be given an optical power as described above.

It is preferable that, as in all the embodiments, the reflective surface RL be disposed inside the first lens unit Gr1. That is, it is preferable that the zoom lens system TL be composed of a first lens unit Gr1 having a reflective surface RL inside it and at least one succeeding lens unit. Disposing the reflective surface RL inside the first lens unit Gr1, which is disposed at the object-side end of the zoom lens system, makes it possible to minimize the dimension of the taking lens apparatus 10 in its thickness direction. As necessary, the optical axis AX may be bent at an angle other than 90°. However, the closer to 90° the angle at which the optical axis AX is bent is, the more compact the taking lens apparatus 10 can be made.

It is preferable that the number of lens elements (excluding cemented lens elements) disposed on the object side of the reflective surface RL be one or smaller. In a bending optical system that is so contracted that its first lens unit Gr1 includes a reflective surface RL for bending the optical axis AX at substantially 90°, the thickness of the zoom lens system TL and thus the taking lens apparatus 10 is practically determined by the distance from the object-side surface of the most object-side lens element to the reflective surface RL. Accordingly, by disposing only one or no lens element on the object side of the reflective surface RL, it is possible to realize a slim zoom lens system TL and thus a slim taking lens apparatus 10.

While the number of lens elements disposed on the object side of the reflective surface RL affects the slimness of the taking lens apparatus 10 as described above, the number of lens elements disposed on the image side of the reflective surface RL affects the length of the taking lens apparatus 10. That is, to make the taking lens apparatus 10 slim, it is preferable to reduce the number of lens elements disposed on the object side of the prism PR, and, to make the taking lens apparatus 10 short, it is preferable to reduce the number of lens elements disposed on the image side of the prism PR. Since the first lens unit Gr1 is the most object-side lens unit among those constituting the zoom lens system TL, it has a large lens diameter and requires a large space. Accordingly, reducing the number of lens elements constituting the first lens unit Gr1 is most effective in making the taking lens apparatus 10 slim and short. Thus, whether the taking lens apparatus 10 can be made satisfactorily slim and short or not depends on how the first lens unit Gr1 can be made compact.

Disposing a cemented lens element or two or more single lens elements on the object side of the prism PR makes it difficult to make the taking lens apparatus 10 slim. Therefore, it is preferable that only one single lens element or no lens element at all (for example, in a case where the entrance-side surface of the prism PR is given an optical power) be disposed on the object side of the prism PR. On the other hand, disposing a cemented lens element or two or more single lens elements on the image side of the prism PR makes it difficult to make the taking lens apparatus 10 short. Therefore, it is preferable that only one single lens element or no lens element at all (for example, in a case where the exit-side surface of the prism PR is given an optical power) be disposed on the image side of the prism PR. In all the embodiments, the first lens unit Gr1 is composed of, from the object side thereof, a first lens element L1, which is a single lens element having a negative optical power, a prism PR having a reflective surface RL for reflecting a light beam in such a way as to bend the optical axis AX at 90°, and a second lens element L2, which is a single lens element having a positive optical power. The resulting compactness of the first lens unit Gr1 helps make the taking lens apparatus 10 satisfactorily slim an compact.

It is preferable that, as in all the embodiments, the first lens unit Gr1 be kept stationary during zooming. That is, it is preferable that, during zooming from the wide-angle end W to the telephoto end T, the first lens unit Gr1 is kept stationary relative to the image plane IM. Keeping the first lens unit Gr1 stationary during zooming helps reduce the length, along the optical axis AX, of the zoom lens system TL at the entrance side thereof. This helps make the zoom lens system TL compact, give it a high magnification, and make the taking lens apparatus 10 and the camera 20 slim. Since the first lens unit Gr1 includes the reflective surface RL, attempting to move the first lens unit Gr1 requires a large space. In particular in a case where the reflective surface RL is realized with a prism PR, attempting to move the prism PR, which is heavy, places a heavy burden on the drive mechanism. This problem can be avoided by keeping the first lens unit Gr1 stationary relative to the image surface IM during zooming as described above, and it is thereby possible to realize a zoom lens system TL of which the total length does not vary (that is, of which the thickness does not vary as a result of zooming or the collapsing of the lens barrel). A zoom lens system TL of which the total length does not vary can be held with a box-shaped structure, and this makes it possible to hold the zoom lens system TL with a highly rigid structure.

Since the first lens unit Gr1 is the most object-side lens unit among those constituting the zoom lens system TL, to achieve a high zoom ratio that fulfills condition (0), it is preferable that the first lens unit Gr1 have a positive optical power. In the first and sixth to eight embodiments, the zoom lens system TL has a five-unit zoom construction of a positive-negative-positivepositive-positive type in which, during zooming from the wide-angle end W to the telephoto end T, the first lens unit Gr1 remains stationary relative to the image plane IM, the second lens unit Gr2 moves toward the image side, the third lens unit Gr3 remains stationary relative to the image plane IM, the fourth lens unit Gr4 moves toward the object side, and the fifth lens unit Gr5 moves toward the image side. Here, since the first lens unit Gr1 has a positive optical power, it is possible to achieve a high zoom ratio that fulfills condition (0). In the second to fifth embodiments, the zoom lens system TL has a four-unit zoom construction of a positive-negative-positive-positive type in which, during zooming from the wide-angle end W to the telephoto end T, the first lens unit Gr1 remains stationary relative to the image plane IM, the second lens unit Gr2 moves toward the image side, the third lens unit Gr3 moves toward the object side, and the fourth lens unit Gr4 moves toward the image side. Here, since the first lens unit Gr1 has a positive optical power, it is possible to achieve a high zoom ratio that fulfills condition (0).

In the first and sixth to eighth embodiments, the third and fifth lens units Gr3 and Gr5 are each composed solely of a single lens element having a positive optical power. In the second to fifth embodiments, the fourth lens unit Gr4 is composed solely of a single lens element having a positive optical power. It is preferable that, in this way, at least one of the lens units constituting the zoom lens system TL be composed solely of one single lens element (accordingly, this lens unit is not one including a cemented lens element or one including two or more single lens elements). As described earlier, it is preferable that only one or no lens element is disposed on the object side of the reflective surface RL. Accordingly, by building at least one lens unit with only one single lens element, it is possible to reduce the number of lens elements constituting the lens unit disposed on the image side of the prism PR, and thereby reduce the dimension of the taking lens apparatus 10 in its length direction. That is, reducing the number of lens elements constituting the individual lens units as much as possible leads to compactness of the taking lens apparatus 10 as a whole.

In a four-unit zoom construction of a positive-negative-positive-positive type, or in a five-unit zoom construction of a positive-negative-positive-positive-positive type, with respect to the optical power of the second lens unit Gr2, which is a movable lens unit, it is preferable that condition (3) below be fulfilled.

$$2<|f2|/w<5 \quad (3)$$

where
f2 represents the focal length of the second lens unit Gr2; and
fw represents the focal length of the entire zoom lens system TL at the wide-angle end W.

Condition (3) defines the preferable conditional range with respect to the optical power of the second lens unit Gr2. If the value of |f2|/fw is greater than the upper limit of condition (3), the optical power of the second lens unit Gr2 is so weak that attempting to achieve a high zoom ratio makes the movement stroke of the second lens unit Gr2 unduly long. This makes it difficult to make the zoom lens system TL compact. By contrast, if the value of |f2|/fw is smaller than the lower limit of condition (3), the optical power of the second lens unit Gr2 is so strong that the second lens unit Gr2 is excessively sensitive to manufacturing errors. This makes the manufacturing of the zoom lens system TL difficult.

It is more preferable that condition (3a) below be fulfilled. Condition (3a) defines, within the conditional range defined by condition (3) above, a more preferable conditional range from the viewpoints noted above.

$$2<|f2|/fw<4 \quad (3a)$$

In a four-unit zoom construction of a positive-negative-(aperture stop ST)-positive-positive type, or in a five-unit zoom construction of a positive-negative-(aperture stop ST)-positive-positive-positive type, with respect to the optical power of the movable lens unit disposed immediately behind the aperture stop ST, it is preferable that condition (4) below be fulfilled.

$$2<fk/fw<6 \quad (4)$$

where
fk represents the focal length of the movable lens unit disposed immediately behind the aperture stop ST; and
fw represents the focal length of the entire zoom lens system TL at the wide-angle end W.

The movable lens unit disposed immediately behind the aperture stop ST is, of the movable lens units located on the image side of the aperture stop ST, the one closest to the aperture stop ST. For example, it is, in the first and sixth to eighth embodiments, the fourth lens unit Gr4 and, in the second to fifth embodiments, the third lens unit Gr3. Condition (4) defines the preferable conditional range with respect to the optical power of that lens unit. If the value of fk/fw is greater than the upper limit of condition (4), the optical power of the movable lens unit is so weak that attempting to achieve a high zoom ratio makes the movement stroke of the movable lens unit unduly long. This makes it difficult to make the zoom lens system TL compact. By contrast, if the value of fk/fw is smaller than the lower limit of condition (4), the optical power of the movable lens unit is so strong that the movable lens unit is excessively sensitive to manufacturing errors. This makes the manufacturing of the zoom lens system TL difficult.

It is more preferable that condition (4a) below be fulfilled. Condition (4a) defines, within the conditional range defined by condition (4) above, a more preferable conditional range from the viewpoints noted above.

$$2<fk/fw<5 \quad (4a)$$

In all the embodiments, the zoom lens system TL is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material. As necessary, in addition to the aperture stop ST, a beam restricting plate or the like for cutting unnecessary light may be arranged.

EXAMPLES

Hereinafter, practical examples of the construction and other features of the zoom lens system used in a taking lens apparatus embodying the present invention will be presented with reference to their construction data and other data.

Examples 1 to 8 presented below are numerical examples corresponding to the first to eighth embodiments, respectively, described hereinbefore, and therefore the optical construction diagrams (FIGS. 1 to 8) of the first to eighth embodiments also show the lens construction of Examples 1 to 8, respectively.

Tables 1 to 8 show the construction data of Examples 1 to 8, respectively. In the construction data of each example, ri (i=1, 2, 3, . . . ) represents the radius of curvature (mm) of the i-th surface from the object side, di (i=1, 2, 3, . . . ) represents the i-th axial distance (mm) from the object side, and Ni (i=1, 2, 3, . . . ) and vi (i=1, 2, 3, . . . ) respectively represent the refractive index (Nd) for the d-line and the Abbe number (vd) of the i-th optical element from the object side. For each of those axial distances which vary during zooming, i.e. variable axial distances, three values are listed, namely, from left, the axial distance observed at the wide-angle end (shortest-focal-length end, W), the axial distance observed at the middle (middle-focal-length point, M), and the axial distance observed at the telephoto end (longest-focal-length end). Shown together with these data are the focal length (f, mm) and f-number (FNO) of the entire system observed in those three different focal-length states W, M, and T. Table 9 shows the values of the conditional formulae as actually observed in Examples 1 to 8.

A surface of which the radius of curvature ri is marked with an asterisk (*) is an aspherical surface (a refractive optical surface having an aspherical shape, a surface that exerts a refractive effect equivalent to that of an aspherical surface, or the like). The surface shape of such an aspherical surface is defined by formula (AS) below. The aspherical surface data of the aspherical surfaces used in each example are also shown (except when Aj=0) together with the other data mentioned above.

$$X(H)=(C0 \cdot H^2)/(1+\sqrt{1-\epsilon \cdot C0^2 \cdot H^2})+\Sigma(Aj \cdot H^j) \quad (AS)$$

where

X(H) represents the displacement along the optical axis AX at the height H (relative to the vertex);

H represents the height in a direction perpendicular to the optical axis AX;

C0 represents the paraxial curvature (=the reciprocal of the radius of curvature);

$\epsilon$ represents the quadric surface parameter; and

Aj represents the aspherical surface coefficient of j-th order.

FIGS. 9A to 9I, FIGS. 10A to 10I, FIGS. 11A to 11I, FIGS. 12A to 12I, FIGS. 13A to 13I, FIGS. 14A to 14I, FIGS. 15A to 15I, and FIGS. 16A to 16I are aberration diagrams of Examples 1 to 8, respectively. Of these aberration diagrams, FIGS. 9A, 9B, 9C, 10A, 10B, 10C, 11A, 11B, 11C, 12A, 12B, 12C, 13A, 13B, 13C, 14A, 14B, 14C, 15A, 15B, 15C, 16A, 16B, and 16C, show the aberrations observed at the wide-angle end W, FIGS. 9D, 9E, 9F, 10D, 10E, 10F, 11D, 11E, 11F, 12D, 12E, 12F, 13D, 13E, 13F, 14D, 14E, 14F, 15D, 15E, 15F, 16D, 16E, and 16F show the aberrations observed at the middle M, and FIGS. 9G, 9H, 9I, 10G, 10H, 10I, 11G, 11H, 11I, 12G, 12H, 12I, 13G, 13H, 13I, 14G, 14H, 14I, 15G, 15H, 15I, 16G, 16H, and 16I show the aberrations observed at the telephoto end T. Of these aberration diagrams, FIGS. 9A, 9D, 9G, 10A, 10D, 10G, 11A, 11D, 11G, 12A, 12D, 12G, 13A, 13D, 13G, 14A, 14D, 14G, 15A, 15D, 15G, 16A, 16D, and 16G show spherical aberration, FIGS. 9B, 9E, 9H, 10B, 10E, 10H, 11B, 11E, 11H, 12B, 12E, 12H, 13B, 13E, 13H, 14B, 14E, 14H, 15B, 15E, 15H, 16B, 16E, and 16H show astigmatism, and FIGS. 8C, 8F, 8I, 9C, 9F, 9I, 10C, 10F, 10I, 11C, 11F, 11I, 12C, 12F, 12I, 13C, 13F, 13I, 14C, 14F, 14I, 15C, 15F, 15I, 16C, 16F, and 16I show distortion, with Y' representing the maximum image height (mm). In the spherical aberration diagrams, the solid line (d) and dash-and-dot line (g) represent the spherical aberration (mm) observed for the d- and g-lines, respectively, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

As described above, according to the present invention, a zoom lens system is built as a bending optical system that fulfills predetermined conditions with respect to the zoom ratio, the number of optical members, and the position of the exit pupil, and this makes it possible to realize a compact, lightweight taking lens apparatus incorporating a compact zoom lens system that offers a high zoom ratio despite being composed of a smaller number of optical members while maintaining satisfactory optical performance over the entire zoom range. By applying a taking lens apparatus according to the present invention to a digital camera, video camera, or camera incorporated in or externally fitted to a digital video unit, personal computer, mobile computer, cellular phone, personal digital assistant, peripheral device therefor (such as a mouse, scanner, printer, or other digital input/output device) or the like, it is possible to contribute to slimming-down, miniaturization, cost reduction, zoom ratio enhancement, performance enhancement, and other improvements of such a device.

Moreover, by restricting to a predetermined distance the axial distance from the most object-side surface of the zoom lens system to the reflective surface, it is possible to effectively achieve slimming-down of the taking lens apparatus. By building the most object-side lens unit with, from the object side thereof, a first lens element, which is a single lens element having a negative optical power, a prism having a reflective surface, and a second lens element, which is a single lens element having a positive optical power, it is possible to make the first lens unit compact and thereby make the taking lens apparatus slim and short. By building at least one of the lens units constituting the zoom lens system with only one single lens element, it is possible, if the lens unit is one disposed on the object side of the reflective surface, to make the taking lens apparatus slim and, if the lens unit is one disposed on the image side of the reflective surface, to make the taking lens apparatus short.

TABLE 1

Example 1
f = 4.5~10.5~22.5, FNO = 3.10~3.50~4.00

| Radius of Curvature | Axial Distance | Refractive Index | Abbe Number |
|---|---|---|---|
| (Gr1) | | | |
| r1 = 22.037 | d1 = 0.850 | N1 = 1.79850 | ν1 = 22.60 |
| r2 = 9.074 | d2 = 2.789 | | |
| r3 = ∞ | d3 = 10.320 | N2 = 1.84666 | ν2 = 23.82(PR) |
| r4 = ∞ | d4 = 0.320 | | |
| r5 = 28.485 | d5 = 3.322 | N3 = 1.76342 | ν3 = 50.07 |
| r6 = −18.915 | d6 = 0.703~7.535~10.085 | | |
| (Gr2) | | | |
| r7* = −10.903 | d7 = 0.850 | N4 = 1.52998 | ν4 = 65.05 |
| r8* = 6.678 | d8 = 0.306 | | |
| r9 = 12.889 | d9 = 1.506 | N5 = 1.79850 | ν5 = 22.60 |
| r10 = 31.652 | d10 = 11.054~4.222~1.672 | | |
| (ST) | | | |
| r11 = ∞ | d11 = 0.500 | | |
| (Gr3) | | | |
| r12 = 9.497 | d12 = 0.850 | N6 = 1.73451 | ν6 = 51.15 |
| r13 = 11.285 | d13 = 11.595~7.186~0.500 | | |
| (Gr4) | | | |
| r14 = 8.924 | d14 = 1.767 | N7 = 1.60106 | ν7 = 58.93 |
| r15 = 20.416 | d15 = 0.100 | | |
| r16 = 7.158 | d16 = 5.838 | N8 = 1.57942 | ν8 = 60.51 |
| r17 = −16.935 | d17 = 0.010 | N9 = 1.51400 | ν9 = 42.83 |
| r18 = −16.935 | d18 = 0.850 | N10 = 1.84506 | ν10 = 23.66 |
| r19* = 9.188 | d19 = 0.400~5.252~13.801 | | |
| (Gr5) | | | |
| r20 = 9.726 | d20 = 1.153 | N11 = 1.52289 | ν11 = 65.83 |
| r21* = −42.516 | d21 = 2.805~2.363~0.500 | | |
| (OF) | | | |
| r22 = ∞ | d22 = 1.462 | N12 = 1.51680 | ν12 = 64.20 |
| r23 = ∞ | d23 = 0.700 | | |
| r24 = ∞ | d24 = 0.750 | N13 = 1.51680 | ν13 = 64.20 |
| r25 = ∞ | | | |

Aspherical Surface Data of Surface r7

$\epsilon = 0.10000 \times 10$, $A4 = 0.59715 \times 10^{-3}$, $A6 = -0.14490 \times 10^{-4}$, $A8 = 0.25429 \times 10^{-6}$, $A10 = 0.69134 \times 10^{-9}$ Aspherical Surface Data of Surface r8

$\epsilon = 0.10000 \times 10$, $A4 = 0.39854 \times 10^{-4}$, $A6 = -0.27342 \times 10^{-4}$, $A8 = 0.74002 \times 10^{-6}$, $A10 = -0.44972 \times 10^{-8}$ Aspherical Surface Data of Surface r19

$\epsilon = 0.10000 \times 10$, $A4 = 0.13802 \times 10^{-2}$, $A6 = 0.39138 \times 10^{-4}$, $A8 = 0.96236 \times 10^{-6}$, $A10 = 0.10714 \times 10^{-7}$ Aspherical Surface Data of Surface r21

$\epsilon = 0.10000 \times 10$, $A4 = 0.14135 \times 10^{-3}$, $A6 = -0.29923 \times 10^{-4}$, $A8 = 0.14899 \times 10^{-5}$, $A10 = -0.21439 \times 10^{-7}$

TABLE 2

Example 2
f = 4.5~10.5~22.5, FNO = 3.10~3.50~4.00

| Radius of Curvature | Axial Distance | Refractive Index | Abbe Number |
|---|---|---|---|
| (Gr1) | | | |
| r1 = 22.116 | d1 = 0.850 | N1 = 1.79850 | ν1 = 22.60 |
| r2 = 9.059 | d2 = 2.795 | | |
| r3 = ∞ | d3 = 10.320 | N2 = 1.84666 | ν2 = 23.82(PR) |
| r4 = ∞ | d4 = 0.320 | | |
| r5 = 28.993 | d5 = 3.545 | N3 = 1.75450 | ν3 = 51.57 |
| r6 = −18.063 | d6 = 0.703~7.304~8.918 | | |

TABLE 2-continued

Example 2
f = 4.5~10.5~22.5, FNO = 3.10~3.50~4.00

| Radius of Curvature | Axial Distance | Refractive Index | Abbe Number |
|---|---|---|---|
| (Gr2) | | | |
| r7* = −11.476 | d7 = 0.850 | N4 = 1.58120 | ν4 = 60.38 |
| r8* = 6.142 | d8 = 0.902 | | |
| r9 = 8.790 | d9 = 1.745 | N5 = 1.84823 | ν5 = 29.43 |
| r10 = 22.355 | d10 = 9.888~3.286~1.672 | | |
| (ST) | | | |
| r11 = ∞ | d11 = 13.109~8.875~1.100 | | |
| (Gr3) | | | |
| r12 = 8.390 | d12 = 2.100 | N6 = 1.70496 | ν6 = 53.41 |
| r13 = 27.970 | d13 = 0.100 | | |
| r14 = 7.216 | d14 = 5.403 | N7 = 1.54360 | ν7 = 63.65 |
| r15 = −14.734 | d15 = 0.010 | N8 = 1.51400 | ν8 = 42.83 |
| r16 = −14.734 | d16 = 0.850 | N9 = 1.84506 | ν9 = 23.66 |
| r17* = 7.159 | d17 = 0.530~5.680~14.564 | | |
| (Gr4) | | | |
| r18 = 9.634 | d18 = 1.344 | N10 = 1.48749 | ν10 = 70.44 |
| r19* = −26.708 | d19 = 2.525~1.608~0.500 | | |
| (OF) | | | |
| r20 = ∞ | d20 = 1.462 | N11 = 1.51680 | ν11 = 64.20 |
| r21 = ∞ | d21 = 0.700 | | |
| r22 = ∞ | d22 = 0.750 | N12 = 1.51680 | ν12 = 64.20 |
| r23 = ∞ | | | |

Aspherical Surface Data of Surface r7

$\epsilon = 0.10000 \times 10$, $A4 = 0.61559 \times 10^{-3}$, $A6 = -0.19203 \times 10^{-4}$, $A8 = 0.42841 \times 10^{-6}$, $A10 = -0.26032 \times 10^{-8}$ Aspherical Surface Data of Surface r8

$\epsilon = 0.10000 \times 10$, $A4 = 0.16031 \times 10^{-3}$, $A6 = -0.24953 \times 10^{-4}$, $A8 = 0.85478 \times 10^{-7}$, $A10 = 0.75833 \times 10^{-8}$ Aspherical Surface Data of Surface r17

$\epsilon = 0.10000 \times 10$, $A4 = 0.16770 \times 10^{-2}$, $A6 = 0.70474 \times 10^{-4}$, $A8 = -0.81748 \times 10^{-6}$, $A10 = 0.35985 \times 10^{-6}$ Aspherical Surface Data of Surface r19

$\epsilon = 0.10000 \times 10$, $A4 = 0.18401 \times 10^{-3}$, $A6 = -0.25527 \times 10^{-4}$, $A8 = 0.10924 \times 10^{-5}$, $A10 = -0.16687 \times 10^{-7}$

TABLE 3

Example 3
f = 4.5~10.5~22.5, FNO = 3.10~3.50~4.00

| Radius of Curvature | Axial Distance | Refractive Index | Abbe Number |
|---|---|---|---|
| (Gr1) | | | |
| r1 = 16.232 | d1 = 0.850 | N1 = 1.82515 | ν1 = 23.24 |
| r2 = 8.253 | d2 = 3.069 | | |
| r3 = ∞ | d3 = 10.320 | N2 = 1.84666 | ν2 = 23.82(PR) |
| r4 = ∞ | d4 = 0.320 | | |
| r5 = 26.774 | d5 = 3.781 | N3 = 1.77715 | ν3 = 47.83 |
| r6 = −18.981 | d6 = 0.703~5.777~9.566 | | |
| (Gr2) | | | |
| r7* = −7.707 | d7 = 0.850 | N4 = 1.60166 | ν4 = 58.98 |
| r8* = 11.015 | d8 = 0.750 | | |
| r9 = 98.480 | d9 = 1.559 | N5 = 1.84726 | ν5 = 23.88 |
| r10 = −25.420 | d10 = 10.535~5.461~1.672 | | |
| (ST) | | | |
| r11 = ∞ | d11 = 12.182~5.714~1.400 | | |
| (Gr3) | | | |
| r12 = 6.052 | d12 = 5.668 | N6 = 1.70231 | ν6 = 54.26 |

TABLE 3-continued

Example 3
f = 4.5~10.5~22.5, FNO = 3.10~3.50~4.00

| Radius of Curvature | Axial Distance | Refractive Index | Abbe Number |
|---|---|---|---|
| r13 = −20.839 | d13 = 0.495 | | |
| r14 = −10.322 | d14 = 0.850 | N7 = 1.79850 | ν7 = 22.59 |
| r15* = 13.363 | d15 = 0.878~8.020~15.115 | | |
| (Gr4) | | | |
| r16 = 28.074 | d16 = 1.223 | N8 = 1.55883 | ν8 = 59.24 |
| r17* = −11.080 | d17 = 3.955~3.281~0.500 | | |
| (OF) | | | |
| r18 = ∞ | d18 = 1.462 | N9 = 1.51680 | ν9 = 64.20 |
| r19 = ∞ | d19 = 0.700 | | |
| r20 = ∞ | d20 = 0.750 | N10 = 1.51680 | ν10 = 64.20 |
| r21 = ∞ | | | |

Aspherical Surface Data of Surface r7

$\epsilon = 0.10000 \times 10$, $A4 = 0.11969 \times 10^{-2}$, $A6 = -0.10987 \times 10^{-4}$, $A8 = 0.37279 \times 10^{-7}$, $A10 = -0.14449 \times 10^{-8}$ Aspherical Surface Data of Surface r8

$\epsilon = 0.10000 \times 10$, $A4 = 0.38336 \times 10^{-3}$, $A6 = -0.16602 \times 10^{-4}$, $A8 = 0.81687 \times 10^{-6}$, $A10 = -0.29950 \times 10^{-7}$ Aspherical Surface Data of Surface r15

$\epsilon = 0.10000 \times 10$, $A4 = 0.18992 \times 10^{-2}$, $A6 = 0.12234 \times 10^{-4}$, $A8 = 0.63566 \times 10^{-5}$, $A10 = 0.92464 \times 10^{-7}$ Aspherical Surface Data of Surface r17

$\epsilon = 0.10000 \times 10$, $A4 = 0.37229 \times 10^{-3}$, $A6 = -0.47125 \times 10^{-4}$, $A8 = 0.25387 \times 10^{-5}$, $A10 = -0.50818 \times 10^{-7}$

TABLE 4

Example 4
f = 4.5~15.0~30.0, FNO = 3.10~3.50~4.00

| Radius of Curvature | Axial Distance | Refractive Index | Abbe Number |
|---|---|---|---|
| (Gr1) | | | |
| r1 = 28.264 | d1 = 0.850 | N1 = 1.84233 | ν1 = 23.71 |
| r2 = 9.854 | d2 = 2.605 | | |
| r3 = ∞ | d3 = 10.320 | N2 = 1.84666 | ν2 = 23.82(PR) |
| r4 = ∞ | d4 = 0.320 | | |
| r5 = 29.477 | d5 = 4.533 | N3 = 1.75388 | ν3 = 51.59 |
| r6 = −19.730 | d6 = 0.703~11.814~11.82 | | |
| (Gr2) | | | |
| r7* = −10.375 | d7 = 0.850 | N4 = 1.57528 | ν4 = 60.84 |
| r8* = 7.037 | d8 = 1.711 | | |
| r9 = 14.360 | d9 = 1.792 | N5 = 1.84855 | ν5 = 30.92 |
| r10 = 413.233 | d10 = 12.792~1.680~1.672 | | |
| (ST) | | | |
| r11 = ∞ | d11 = 19.188~12.168~1.100 | | |
| (Gr3) | | | |
| r12 = 9.217 | d12 = 2.943 | N6 = 1.68409 | ν6 = 50.71 |
| r13 = 79.543 | d13 = 0.110 | | |
| r14 = 8.774 | d14 = 5.413 | N7 = 1.51793 | ν7 = 56.76 |
| r15 = −11.479 | d15 = 0.010 | N8 = 1.51400 | ν8 = 42.83 |
| r16 = −11.479 | d16 = 0.878 | N9 = 1.84506 | ν9 = 23.66 |
| r17* = 7.409 | d17 = 1.320~10.606~22.339 | | |
| (Gr4) | | | |
| r18 = 11.901 | d18 = 1.347 | N10 = 1.48749 | ν10 = 70.44 |
| r19* = −26.415 | d19 = 3.431~1.165~0.500 | | |
| (OF) | | | |
| r20 = ∞ | d20 = 1.462 | N11 = 1.51680 | ν11 = 64.20 |
| r21 = ∞ | d21 = 0.700 | | |

TABLE 4-continued

Example 4
f = 4.5~15.0~30.0, FNO = 3.10~3.50~4.00

| Radius of Curvature | Axial Distance | Refractive Index | Abbe Number |
|---|---|---|---|
| r22 = ∞ | d22 = 0.750 | N12 = 1.51680 | ν12 = 64.20 |
| r23 = ∞ | | | |

Aspherical Surface Data of Surface r7

$\epsilon = 0.10000 \times 10$, $A4 = 0.71665 \times 10^{-3}$, $A6 = -0.19312 \times 10^{-4}$, $A8 = 0.38238 \times 10^{-6}$, $A10 = -0.32743 \times 10^{-8}$ Aspherical Surface Data of Surface r8

$\epsilon = 0.10000 \times 10$, $A4 = 0.85308 \times 10^{-4}$, $A6 = -0.23890 \times 10^{-4}$, $A8 = 0.31951 \times 10^{-6}$, $A10 = -0.28899 \times 10^{-8}$ Aspherical Surface Data of Surface r17

$\epsilon = 0.10000 \times 10$, $A4 = 0.95275 \times 10^{-3}$, $A6 = 0.15785 \times 10^{-4}$, $A8 = 0.81660 \times 10^{-6}$, $A10 = 0.66315 \times 10^{-7}$ Aspherical Surface Data of Surface r19

$\epsilon = 0.10000 \times 10$, $A4 = 0.20804 \times 10^{-3}$, $A6 = -0.16994 \times 10^{-4}$, $A8 = 0.47339 \times 10^{-6}$, $A10 = 0.28048 \times 10^{-9}$

TABLE 5

Example 5
f = 4.5~20.0~42.0, FNO = 3.10~3.50~4.00

| Radius of Curvature | Axial Distance | Refractive Index | Abbe Number |
|---|---|---|---|
| (Gr1) | | | |
| r1 = 44.857 | d1 = 5.000 | N1 = 1.74032 | ν1 = 24.66 |
| r2 = 13.611 | d2 = 3.100 | | |
| r3 = ∞ | d3 = 10.320 | N2 = 1.84666 | ν2 = 23.82(PR) |
| r4 = ∞ | d4 = 0.320 | | |
| r5 = 28.454 | d5 = 5.068 | N3 = 1.70804 | ν3 = 53.88 |
| r6 = −29.252 | d6 = 0.703~19.454~17.917 | | |
| (Gr2) | | | |
| r7* = −10.900 | d7 = 0.850 | N4 = 1.58745 | ν4 = 52.88 |
| r8* = 8.121 | d8 = 1.749 | | |
| r9 = 15.931 | d9 = 1.918 | N5 = 1.84139 | ν5 = 23.69 |
| r10 = 189.785 | d10 = 18.886~0.134~1.672 | | |
| (ST) | | | |
| r11 = ∞ | d11 = 20.763~15.209~1.100 | | |
| (Gr3) | | | |
| r12 = 9.739 | d12 = 3.077 | N6 = 1.68103 | ν6 = 54.44 |
| r13 = 158.520 | d13 = 0.100 | | |
| r14 = 9.020 | d14 = 5.549 | N7 = 1.52394 | ν7 = 51.51 |
| r15 = −11.560 | d15 = 0.010 | N8 = 1.51400 | ν8 = 42.83 |
| r16 = −11.560 | d16 = 0.850 | N9 = 1.84506 | ν9 = 23.66 |
| r17* = 8.023 | d17 = 1.082~8.304~22.229 | | |
| (Gr4) | | | |
| r18 = −293.354 | d18 = 6.756 | N10 = 1.78490 | ν10 = 46.91 |
| r19* = −12.191 | d19 = 1.984~0.316~0.500 | | |
| (OF) | | | |
| r20 = ∞ | d20 = 1.462 | N11 = 1.51680 | ν11 = 64.20 |
| r21 = ∞ | d21 = 0.700 | | |
| r22 = ∞ | d22 = 0.750 | N12 = 1.51680 | ν12 = 64.20 |
| r23 = ∞ | | | |

Aspherical Surface Data of Surface r7

$\epsilon = 0.10000 \times 10$, $A4 = 0.63689 \times 10^{-3}$, $A6 = -0.19814 \times 10^{-4}$, $A8 = 0.48436 \times 10^{-6}$, $A10 = -0.47937 \times 10^{-8}$ Aspherical Surface Data of Surface r8

$\epsilon = 0.10000 \times 10$, $A4 = 0.14676 \times 10^{-3}$, $A6 = -0.19990 \times 10^{-4}$, $A8 = 0.37172 \times 10^{-6}$, $A10 = -0.31576 \times 10^{-8}$ TABLE 5-continued Example 5
f = 4.5~20.0~42.0, FNO = 3.10~3.50~4.00

| Radius of Curvature | Axial Distance | Refractive Index | Abbe Number |
|---|---|---|---|

Aspherical Surface Data of Surface r17

$\epsilon = 0.10000 \times 10$, $A4 = 0.83281 \times 10^{-3}$, $A6 = 0.13250 \times 10^{-4}$, $A8 = 0.20264 \times 10^{-6}$, $A10 = 0.55852 \times 10^{-7}$ Aspherical Surface Data of Surface r19

$\epsilon = 0.10000 \times 10$, $A4 = 0.42601 \times 10^{-3}$, $A6 = -0.74029 \times 10^{-5}$, $A8 = 0.13279 \times 10^{-6}$, $A10 = -0.43230 \times 10^{-8}$

TABLE 6

Example 6
f = 4.5~20.0~30.0, FNO = 3.10~3.50~4.00

| Radius of Curvature | Axial Distance | Refractive Index | Abbe Number |
|---|---|---|---|
| (Gr1) | | | |
| r1 = 23.367 | d1 = 3.128 | N1 = 1.79850 | ν1 = 22.60 |
| r2 = 9.453 | d2 = 3.281 | | |
| r3 = ∞ | d3 = 10.320 | N2 = 1.84666 | ν2 = 23.82(PR) |
| r4 = ∞ | d4 = 0.320 | | |
| r5 = 29.929 | d5 = 3.867 | N3 = 1.74805 | ν3 = 51.79 |
| r6 = −19.637 | d6 = 0.703~10.978~11.753 | | |
| (Gr2) | | | |
| r7* = −12.107 | d7 = 0.850 | N4 = 1.53043 | ν4 = 63.71 |
| r8* = 6.549 | d8 = 0.617 | | |
| r9 = 9.736 | d9 = 1.579 | N5 = 1.80292 | ν5 = 22.71 |
| r10 = 16.863 | d10 = 12.722~2.447~1.672 | | |
| (ST) | | | |
| r11 = ∞ | d11 = 0.500 | | |
| (Gr3) | | | |
| r12 = 10.605 | d12 = 0.850 | N6 = 1.72115 | ν6 = 38.52 |
| r13 = 12.772 | d13 = 15.559~5.353~0.500 | | |
| (Gr4) | | | |
| r14 = 9.179 | d14 = 2.609 | N7 = 1.59277 | ν7 = 59.51 |
| r15 = 42.268 | d15 = 0.100 | | |
| r16 = 8.589 | d16 = 5.776 | N8 = 1.57072 | ν8 = 61.21 |
| r17 = −15.945 | d17 = 0.010 | N9 = 1.51400 | ν9 = 42.83 |
| r18 = −15.945 | d18 = 0.850 | N10 = 1.84506 | ν10 = 23.66 |
| r19* = 8.686 | d19 = 0.864~12.608~18.162 | | |
| (Gr5) | | | |
| r20 = 9.665 | d20 = 1.248 | N11 = 1.57125 | ν11 = 44.05 |
| r21* = −71.558 | d21 = 2.740~1.201~0.500 | | |
| (OF) | | | |
| r22 = ∞ | d22 = 1.462 | N12 = 1.51680 | ν12 = 64.20 |
| r23 = ∞ | d23 = 0.700 | | |
| r24 = ∞ | d24 = 0.750 | N13 = 1.51680 | ν13 = 64.20 |
| r25 = ∞ | | | |

Aspherical Surface Data of Surface r7

$\epsilon = 0.10000 \times 10$, $A4 = 0.54344 \times 10^{-3}$, $A6 = -0.15432 \times 10^{-4}$, $A8 = 0.37636 \times 10^{-6}$, $A10 = -0.40648 \times 10^{-8}$ Aspherical Surface Data of Surface r8

$\epsilon = 0.10000 \times 10$, $A4 = 0.13784 \times 10^{-3}$, $A6 = -0.22923 \times 10^{-4}$, $A8 = 0.47738 \times 10^{-6}$, $A10 = -0.11368 \times 10^{-7}$ Aspherical Surface Data of Surface r19

$\epsilon = 0.10000 \times 10$, $A4 = 0.10214 \times 10^{-2}$, $A6 = 0.16459 \times 10^{-4}$, $A8 = 0.71781 \times 10^{-6}$, $A10 = 0.45529 \times 10^{-7}$ TABLE 6-continued Example 6
f = 4.5~20.0~30.0, FNO = 3.10~3.50~4.00

| Radius of Curvature | Axial Distance | Refractive Index | Abbe Number |
|---|---|---|---|

Aspherical Surface Data of Surface r21

$\epsilon = 0.10000 \times 10$, $A4 = 0.22680 \times 10^{-4}$, $A6 = -0.19484 \times 10^{-4}$, $A8 = 0.11212 \times 10^{-5}$, $A10 = -0.26622 \times 10^{-7}$

TABLE 7

Example 7
f = 4.5~20.0~40.0, FNO = 3.10~3.50~4.00

| Radius of Curvature | Axial Distance | Refractive Index | Abbe Number |
|---|---|---|---|
| (Gr1) | | | |
| r1 = 38.648 | d1 = 5.000 | N1 = 1.77859 | ν1 = 23.75 |
| r2 = 12.914 | d2 = 3.710 | | |
| r3 = ∞ | d3 = 10.320 | N2 = 1.84666 | ν2 = 23.82(PR) |
| r4 = ∞ | d4 = 0.320 | | |
| r5 = 33.094 | d5 = 4.642 | N3 = 1.70731 | ν3 = 53.31 |
| r6 = −24.710 | d6 = 0.703~17.904~19.168 | | |
| (Gr2) | | | |
| r7* = −12.380 | d7 = 0.850 | N4 = 1.52946 | ν4 = 53.96 |
| r8* = 6.802 | d8 = 1.554 | | |
| r9 = 12.627 | d9 = 1.851 | N5 = 1.82285 | ν5 = 23.22 |
| r10 = 39.142 | d10 = 20.137~2.936~1.672 | | |
| (ST) | | | |
| r11 = ∞ | d11 = 0.500 | | |
| (Gr3) | | | |
| r12 = 11.652 | d12 = 0.850 | N6 = 1.48749 | ν6 = 70.44 |
| r13 = 13.694 | d13 = 19.137~10.645~0.500 | | |
| (Gr4) | | | |
| r14 = 10.094 | d14 = 3.488 | N7 = 1.57296 | ν7 = 56.75 |
| r15 = 80.445 | d15 = 0.118 | | |
| r16 = 9.312 | d16 = 6.023 | N8 = 1.54839 | ν8 = 51.18 |
| r17 = −14.758 | d17 = 0.010 | N9 = 1.51400 | ν9 = 42.83 |
| r18 = −14.758 | d18 = 1.835 | N10 = 1.84506 | ν10 = 23.66 |
| r19* = 8.278 | d19 = 1.470~10.710~21.902 | | |
| (Gr5) | | | |
| r20 = 6.953 | d20 = 1.610 | N11 = 1.48749 | ν11 = 70.44 |
| r21* = 131.001 | d21 = 2.295~1.546~0.500 | | |
| (OF) | | | |
| r22 = ∞ | d22 = 1.462 | N12 = 1.51680 | ν12 = 64.20 |
| r23 = ∞ | d23 = 0.700 | | |
| r24 = ∞ | d24 = 0.750 | N13 = 1.51680 | ν13 = 64.20 |
| r25 = ∞ | | | |

Aspherical Surface Data of Surface r7

$\epsilon = 0.10000 \times 10$, $A4 = 0.53988 \times 10^{-3}$, $A6 = -0.13495 \times 10^{-4}$, $A8 = 0.23800 \times 10^{-6}$, $A10 = -0.15443 \times 10^{-8}$ Aspherical Surface Data of Surface r8

$\epsilon = 0.10000 \times 10$, $A4 = 0.10929 \times 10^{-3}$, $A6 = -0.18855 \times 10^{-4}$, $A8 = 0.15762 \times 10^{-6}$, $A10 = -0.17880 \times 10^{-8}$ Aspherical Surface Data of Surface r19

$\epsilon = 0.10000 \times 10$, $A4 = 0.78390 \times 10^{-3}$, $A6 = 0.16673 \times 10^{-4}$, $A8 = 0.40149 \times 10^{-6}$, $A10 = 0.43688 \times 10^{-7}$ Aspherical Surface Data of Surface r21

$\epsilon = 0.10000 \times 10$, $A4 = -0.28076 \times 10^{-4}$, $A6 = 0.65346 \times 10^{-5}$, $A8 = -0.13252 \times 10^{-5}$, $A10 = 0.44962 \times 10^{-7}$ Example 8
f = 4.5~20.0~45.0, FNO = 3.10~3.50~4.00

| Radius of Curvature | Axial Distance | Refractive Index | Abbe Number |
|---|---|---|---|
| (Gr1) | | | |
| r1 = 39.215 | d1 = 5.000 | N1 = 1.75779 | ν1 = 23.97 |
| r2 = 14.670 | d2 = 3.749 | | |
| r3 = ∞ | d3 = 10.320 | N2 = 1.84666 | ν2 = 23.82(PR) |
| r4 = ∞ | d4 = 0.320 | | |
| r5 = 31.096 | d5 = 5.041 | N3 = 1.69120 | ν3 = 53.99 |
| r6 = −29.981 | d6 = 0.703~18.823~20.917 | | |
| (Gr2) | | | |
| r7* = −12.666 | d7 = 0.850 | N4 = 1.53495 | ν4 = 51.53 |
| r8* = 7.068 | d8 = 1.963 | | |
| r9 = 14.175 | d9 = 1.939 | N5 = 1.79850 | ν5 = 22.60 |
| r10 = 53.583 | d10 = 21.887~3.767~1.672 | | |
| (ST) | | | |
| r11 = ∞ | d11 = 0.500 | | |
| (Gr3) | | | |
| r12 = 12.165 | d12 = 0.850 | N6 = 1.48749 | ν6 = 70.44 |
| r13 = 13.879 | d13 = 20.337~11.868~0.500 | | |
| (Gr4) | | | |
| r14 = 10.932 | d14 = 4.340 | N7 = 1.57088 | ν7 = 61.20 |
| r15 = 101.294 | d15 = 0.100 | | |
| r16 = 9.345 | d16 = 6.035 | N8 = 1.54044 | ν8 = 48.39 |
| r17 = −16.572 | d17 = 0.010 | N9 = 1.51400 | ν9 = 42.83 |
| r18 = −16.571 | d18 = 2.142 | N10 = 1.84506 | ν10 = 23.66 |
| r19* = 8.569 | d19 = 0.840~9.985~22.644 | | |
| (Gr5) | | | |
| r20 = 7.261 | d20 = 1.813 | N11 = 1.48749 | ν11 = 70.44 |
| r21* = −423.609 | d21 = 2.466~1.790~0.500 | | |
| (OF) | | | |
| r22 = ∞ | d22 = 1.462 | N12 = 1.51680 | ν12 = 64.20 |
| r23 = ∞ | d23 = 0.700 | | |
| r24 = ∞ | d24 = 0.750 | N13 = 1.51680 | ν13 = 64.20 |
| r25 = ∞ | | | |

Aspherical Surface Data of Surface r7

$\epsilon = 0.10000 \times 10$, $A4 = 0.48353 \times 10^{-3}$, $A6 = -0.10303 \times 10^{-4}$, $A8 = 0.15799 \times 10^{-6}$, $A10 = -0.87835 \times 10^{-9}$ Aspherical Surface Data of Surface r8

$\epsilon = 0.10000 \times 10$, $A4 = 0.56450 \times 10^{-4}$, $A6 = -0.14588 \times 10^{-4}$, $A8 = 0.11032 \times 10^{-6}$, $A10 = -0.14600 \times 10^{-8}$ Aspherical Surface Data of Surface r19

$\epsilon = 0.10000 \times 10$, $A4 = 0.67880 \times 10^{-3}$, $A6 = 0.11968 \times 10^{-4}$, $A8 = 0.41696 \times 10^{-6}$, $A10 = 0.16577 \times 10^{-7}$ Aspherical Surface Data of Surface r21

$\epsilon = 0.10000 \times 10$, $A4 = 0.12200 \times 10^{-4}$, $A6 = -0.29688 \times 10^{-5}$, $A8 = -0.44111 \times 10^{-6}$, $A10 = 0.19427 \times 10^{-7}$

TABLE 9

| | (0) ft/fw | (1), (1a) \|EPw\|/BFw | (2), (2a) D/fw | (3), (3a) \|f2\|/fw | (4), (4a) fk/fw |
|---|---|---|---|---|---|
| Example 1 | 5.0 | 21.19 | 2.04 | 2.41 | 3.38 |
| Example 2 | 5.0 | 21.49 | 1.96 | 2.74 | 3.00 |
| Example 3 | 5.0 | 8.42 | 2.11 | 2.66 | 3.44 |
| Example 4 | 6.7 | 9.84 | 1.96 | 3.30 | 3.69 |
| Example 5 | 9.3 | 5.42 | 1.92 | 3.21 | 3.74 |
| Example 6 | 6.7 | 3.17 | 3.19 | 2.47 | 3.65 |
| Example 7 | 8.9 | 4.50 | 2.68 | 3.18 | 4.17 |
| Example 8 | 10.0 | 4.72 | 3.33 | 3.25 | 4.32 |

What is claimed is:

1. A taking lens apparatus comprising:

a zoom lens system for forming an optical image of an object at a variable magnification, the zoom lens system including an aperture stop in an optical path; and an image sensor having a light-receiving surface on which to receive the optical image formed by the zoom lens system, the image sensor converting the optical image into an electrical image signal and outputting the electrical image signal;

wherein the zoom lens system is composed of nine or less optical members having optical power, and additionally, a reflective member that has a reflective surface for reflecting a light beam in such a way that an optical axis is bent at substantially 90°, wherein the following conditions are fulfilled:

$$5 \leq ft/fw \leq 10$$

$$3 < |EPw|/BFw < 22$$

where fw represents a focal length of the entire zoom lens system at a wide-angle end;

ft represents a focal length of the entire zoom lens system at a telephoto end;

EPw represents an axial distance from an image plane to an exit pupil at the wide-angle end; and BFw represents an axial distance from an image-side surface of a most image-side lens element to the image plane at the wide-angle end, and wherein the zoom lens system comprises a first lens unit having a positive optical power, a second lens unit having a negative optical power, a third lens unit having a positive optical power, and a fourth lens unit having a positive optical power, and the following condition is fulfilled:

$$2 < |f2|/fw < 5$$

where f2 represents a focal length of the second lens unit: and fw represents the focal length of the entire zoom lens system at the wide-angle end.

2. A taking lens apparatus as claimed in claim 1, wherein the zoom lens system is composed of eight or less optical members having an optical power.

3. A taking lens apparatus as claimed in claim 1, wherein the following condition is fulfilled:

$$1 < D/fw < 5$$

where

D represents an axial distance from a most object-side surface to the reflective surface; and fw represents the focal length of the entire zoom lens system at the wide-angle end.

4. A taking lens apparatus as claimed in claim 1, wherein the zoom lens system includes, from an object side end thereof, a single lens element having a negative optical power and then the reflective surface.

5. A taking lens apparatus as claimed in claim 1, wherein the following condition is fulfilled:

$$2 < fk/fw < 6$$

where fk represents a focal length of a movable lens unit disposed immediately behind the aperture stop; and fw represents the focal length of the entire zoom lens system at the wide-angle end.

6. A taking lens apparatus as claimed in claim 1, wherein the zoom lens system is composed of, from the object side thereof, a first lens unit having a positive optical power, a second lens unit having a negative optical power, a third lens unit having a positive optical power, and a fourth lens unit having a positive optical power.

7. A taking lens apparatus as claimed in claim 6, wherein the first lens unit comprises a single lens element having a negative optical power, the reflective surface, and a single lens element having a positive optical power.

8. A taking lens apparatus comprising:

a zoom lens system for forming an optical image of an object at a variable magnification, the zoom lens system including an aperture stop in an optical path; and an image sensor having a light-receiving surface on which to receive the optical image formed by the zoom lens system, the image sensor converting the optical image into an electrical image signal and outputting the electrical image signal;

wherein the zoom lens system is composed of nine or less optical members having optical power, and additionally, a reflective member that has a reflective surface for reflecting a light beam in such a way that an optical axis is bent at substantially 90°, wherein the following conditions are fulfilled:

$$5 \leq ft/fw \leq 10$$

$$3 < |EPw|/BFw \leq 22$$

where fw represents a focal length of the entire zoom lens system at a wide-angle end:

fi represents a focal length of the entire zoom lens system at a telephoto end:

EPw represents an axial distance from an image plane to an exit pupil at the wide- angle end: and BFw represents an axial distance from an image-side surface of a most image-side lens element to the image plane at the wide-angle end, and wherein the zoom lens system is composed of, from the object side thereof, a first lens unit having a positive optical power, a second lens unit having a negative optical power, a third lens unit having a positive optical power, a fourth lens unit having a positive optical power, and a fifih lens unit having a positive optical power.

9. A taking lens apparatus as claimed in claim 8, wherein the first lens unit comprises a single lens element having a negative optical power, the reflective surface, and a single lens element having a positive optical power.

10. A taking lens apparatus as claimed in claim 1, wherein the zoom lens system comprises a plurality of lens units, of which a most object-side lens unit is kept stationary relative to the image sensor during zooming.

11. A taking lens apparatus as claimed in claim 1, wherein the aperture stop is kept stationary relative to the image sensor during zooming.

12. A camera comprising:

a taking lens apparatus having:

a zoom lens system for forming an optical image of an object at a variable magnification, the zoom lens system including an aperture stop in an optical path; and an image sensor having a light-receiving surface on which to receive the optical image formed by the zoom lens system, the image sensor converting the optical image into an electrical image signal and outputting the electrical image signal;

wherein the zoom lens system is composed of nine or less optical members having optical power, and additionally, a reflective member that has a reflective surface for reflecting a light beam in such a way that an optical axis is bent at substantially 90°, and wherein the following conditions are fulfilled:

$$5 \leq ft/fw \leq 10$$

$$3 < |EPw|/BFw < 22$$

where
- fw represents a focal length of the entire zoom lens system at a wide-angle end;
- ft represents a focal length of the entire zoom lens system at a telephoto end;
- EPw represents an axial distance from an image plane to an exit pupil at the wide-angle end; and
- BFw represents an axial distance from an image-side surface of a most image-side lens element to the image plane at the wide-angle end.
- wherein the zoom lens system comprises a first lens unit having a positive optical power, a second lens unit having a negative optical power, a third lens unit having a positive optical power, and a fourth lens unit having a positive optical power, and the following condition is fulfilled:

$$2<|f2|/fw<5$$

where
- f2 represents a focal length of a second lens unit: and
- fw represents the focal length of the entire zoom lens system at the wide-angle end.

13. A camera as claimed in claim 12, wherein the zoom lens system is composed of eight or less optical members having an optical power.

14. A camera as claimed in claim 12, wherein the following condition is fulfilled:

$$1<D/fw<5$$

where
- D represents an axial distance from a most object-side surface to the reflective surface; and
- fw represents the focal length of the entire zoom lens system at the wide-angle end.

15. A camera as claimed in claim 12, wherein the zoom lens system includes, from an object side end thereof, a single lens element having a negative optical power and then the reflective surface.

16. A camera as claimed in claim 12, wherein the following condition is fulfilled:

$$2<fk/fw<6$$

where
- fk represents a focal length of a movable lens unit disposed immediately behind the aperture stop; and
- fw represents the focal length of the entire zoom lens system at the wide-angle end.

17. A camera as claimed in claim 12, wherein the zoom lens system is composed of, from the object side thereof, a first lens unit having a positive optical power, a second lens unit having a negative optical power, a third lens unit having a positive optical power, and a fourth lens unit having a positive optical power.

18. A camera as claimed in claim 17, wherein the first lens unit comprises a single lens element having a negative optical power, the reflective surface, and a single lens element having a positive optical power.

19. A camera comprising:
- a taking lens apparatus having:
  - a zoom lens system for forming an optical image of an object at a variable magnification, the zoom lens system including an aperture stop in an optical path; and
  - an image sensor having a light-receiving surface on which to receive the optical image formed by the zoom lens system, the image sensor converting the optical image into an electrical image signal and outputting the electrical image signal;
- wherein the zoom lens system is composed of nine or less optical members having optical power, and additionally, a reflective member that has a reflective surface for reflecting a light beam in such a way that an optical axis is bent at substantially 90°, and
- wherein the following conditions are fulfilled:

$$5 \leq ft/fw \leq 10$$

$$3<|EPw|/BFw<22$$

where
- fw represents a focal length of the entire zoom lens system at a wide-angle end:
- ft represents a focal length of the entire zoom lens system at a telephoto end:
- EPw represents an axial distance from an image plane to an exit pupil at the wide-angle end:
- BFw represents an axial distance from an image-side surface of a most image-side lens element to the image plane at the wide-angle end, and
- wherein the zoom lens system is composed of, from the object side thereof, a first lens unit having a positive optical power, a second lens unit having a negative optical power, a third lens unit having a positive optical power, a fourth lens unit having a positive optical power, and a fifth lens unit having a positive optical power.

20. A camera as claimed in claim 19, wherein the first lens unit is comprises a single lens element having a negative optical power, the reflective surface, and a single lens element having a positive optical power.

21. A camera as claimed in claim 12, wherein the zoom lens system comprises a plurality of lens units, of which a most object-side lens unit is kept stationary relative to the image sensor during zooming.

22. A camera as claimed in claim 12, wherein the aperture stop is kept stationary relative to the image sensor during zooming.

* * * * *

UNITED STATES PATENT AND TRADEMARK OFFICE
CERTIFICATE OF CORRECTION

PATENT NO. : 7,508,595 B2  Page 1 of 1
APPLICATION NO. : 10/639313
DATED : March 24, 2009
INVENTOR(S) : Kaori Kojima It is certified that error appears in the above-identified patent and that said Letters Patent is hereby corrected as shown below:

Column 32:
line 18, delete "$3 < |\mathrm{EPw}| / \mathrm{BFw} \leqq 22$" and
insert -- $3 < |\mathrm{EPw}| / \mathrm{BFw} < 22$ --.

line 23, delete "fi represents" and
insert -- ft represents --.

Column 33:
line 10, delete "plane at the wide-angle end." and
insert -- plane at the wide-angle end, and --.

Column 34:
line 27, delete "fi represents" and
insert -- ft represents --.

line 42, delete "unit is comprises" and
insert -- unit comprises --.

Signed and Sealed this

Twelfth Day of May, 2009

JOHN DOLL
*Acting Director of the United States Patent and Trademark Office*